US012689544B2

(12) United States Patent
Bar-Or Tillinger et al.

(10) Patent No.: US 12,689,544 B2
(45) Date of Patent: Jul. 21, 2026

(54) CHANNEL PRECODER SELECTION FOR UPLINK WIRELESS COMMUNICATIONS

(71) Applicant: QUALCOMM Incorporated, San Diego, CA (US)

(72) Inventors: Amit Bar-Or Tillinger, Tel-Aviv (IL); Shay Landis, Hod Hasharon (IL); Yehonatan Dallal, Kfar Saba (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 18/180,431

(22) Filed: Mar. 8, 2023

(65) Prior Publication Data

US 2024/0305504 A1     Sep. 12, 2024

(51) Int. Cl.
*H04L 25/02*          (2006.01)

(52) U.S. Cl.
CPC ...... *H04L 25/0254* (2013.01); *H04L 25/0242* (2013.01)

(58) Field of Classification Search
CPC ...................... H04L 25/0254; H04L 25/0242
See application file for complete search history.

(56) References Cited

U.S. PATENT DOCUMENTS

| | | | | |
|---|---|---|---|---|
| 2022/0279533 A1* | 9/2022 | Mao | ...................... | H04B 7/0452 |
| 2022/0400471 A1* | 12/2022 | Hu | ........................ | H04W 72/23 |
| 2022/0407745 A1* | 12/2022 | Lo | ......................... | H04W 24/02 |
| 2023/0132826 A1* | 5/2023 | Muralidhar | .......... | H04B 7/0478 370/252 |
| 2023/0342593 A1* | 10/2023 | Sun | ...................... | H04L 25/0224 |
| 2024/0187050 A1* | 6/2024 | Huang | .............. | H04L 25/03343 |
| 2024/0380483 A1* | 11/2024 | Green | ................. | H04L 25/0254 |
| 2025/0070837 A1* | 2/2025 | Kim | ...................... | H04B 7/0626 |
| 2025/0211363 A1* | 6/2025 | Ren | ...................... | H04B 17/336 |

FOREIGN PATENT DOCUMENTS

WO          WO-2024094273 A1 *   5/2024   ......... H04L 25/0254

* cited by examiner

*Primary Examiner* — Schquita D Goodwin
(74) *Attorney, Agent, or Firm* — Holland & Hart LLP

(57)          ABSTRACT
Methods, systems, and devices for wireless communications are described that provide machine-learning models, such as neural network (NN) based precoding functions, that may be used at a user equipment (UE) to determine precoding parameters directly based on channel estimations performed at the UE. A network entity may measure a channel used for communications with the UE and determine coefficients that are to be applied to a machine learning precoding function (e.g., a NN precoding function) at the UE. The network entity may provide the determined coefficients to the UE. The UE may use the indicated coefficients in the NN based precoding function, along with a channel estimation of a channel associated with an uplink transmission, to determine a precoding matrix that is to be applied for the uplink transmission.

30 Claims, 20 Drawing Sheets

105-a
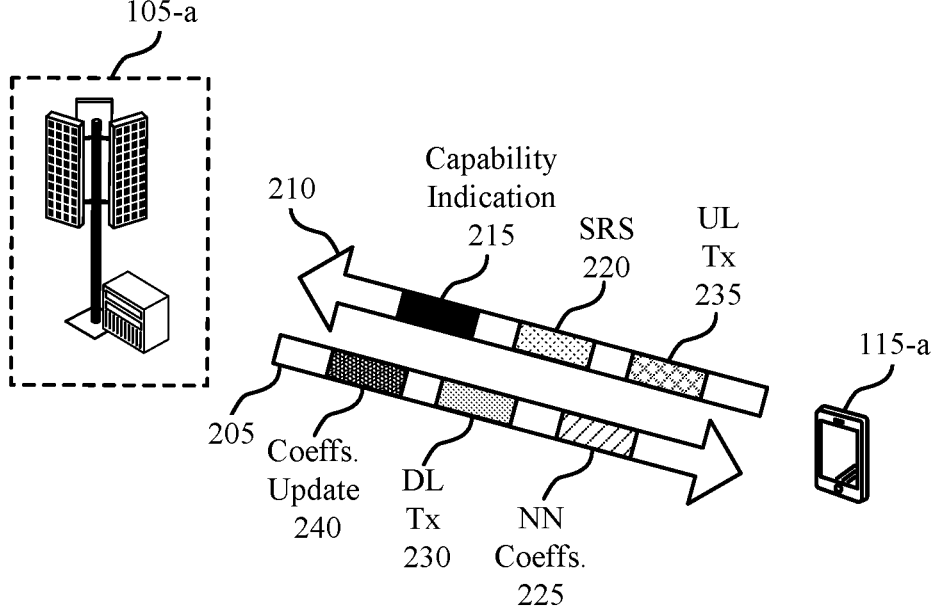
210
Capability
Indication
215
SRS
220
UL
Tx
235
115-a
205
Coeffs.
Update
240
DL
Tx
230
NN
Coeffs.
225
200
FIG. 2

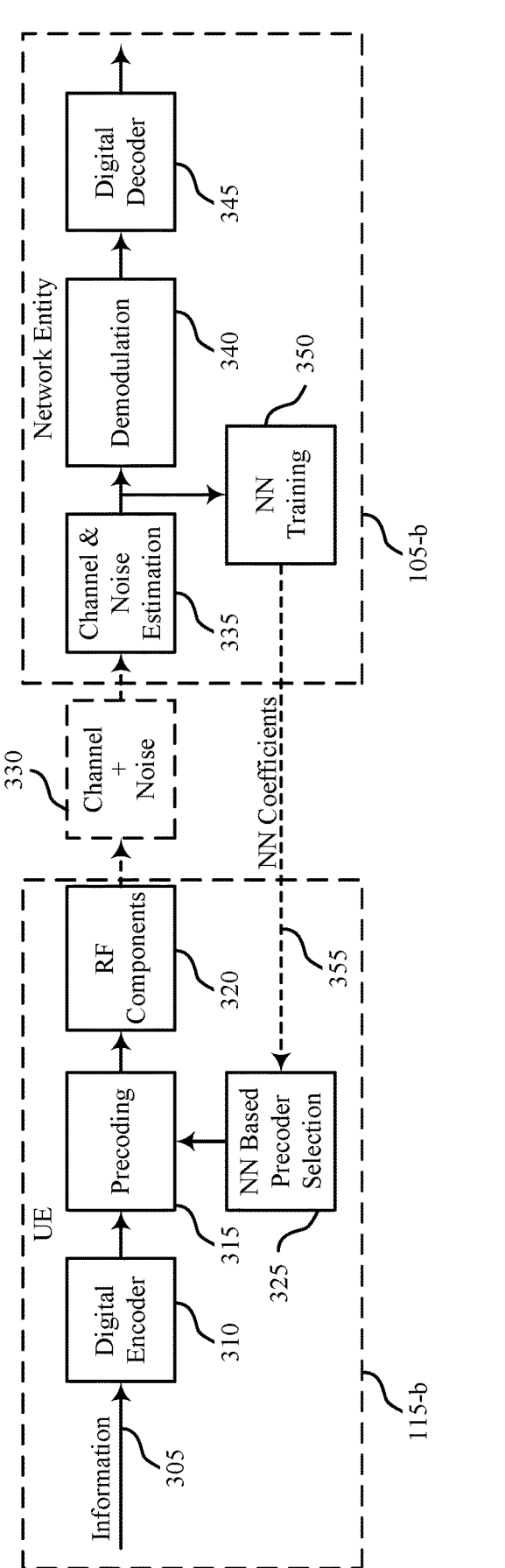
FIG. 3

NN Based Precoding Manager

725

Channel Estimation Manager

730

Uplink Transmission Manager

735

NN Capability Manager

740

Uplink Reference Signal Manager

745

720

700

130

105

115

Network
Entity

Transceiver

1210

Antenna

1215

Communications
Manager

1220

1240

Memory

Code

1230

1225

Processor

1235

1205

1200

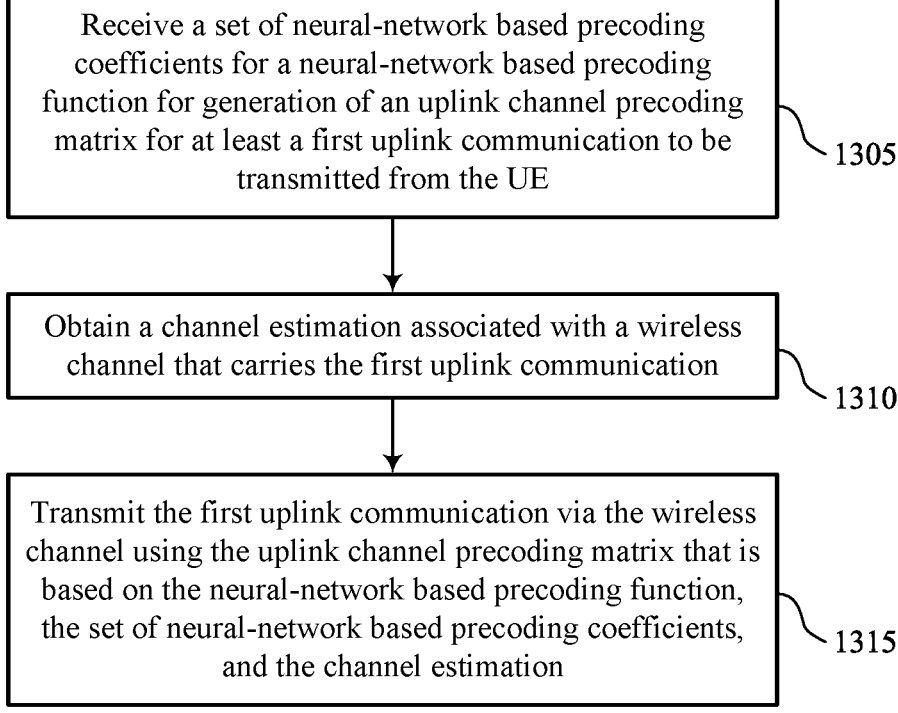

Receive a set of neural-network based precoding coefficients for a neural-network based precoding function for generation of an uplink channel precoding matrix for at least a first uplink communication to be transmitted from the UE    1305

Obtain a channel estimation associated with a wireless channel that carries the first uplink communication    1310

Transmit the first uplink communication via the wireless channel using the uplink channel precoding matrix that is based on the neural-network based precoding function, the set of neural-network based precoding coefficients, and the channel estimation    1315

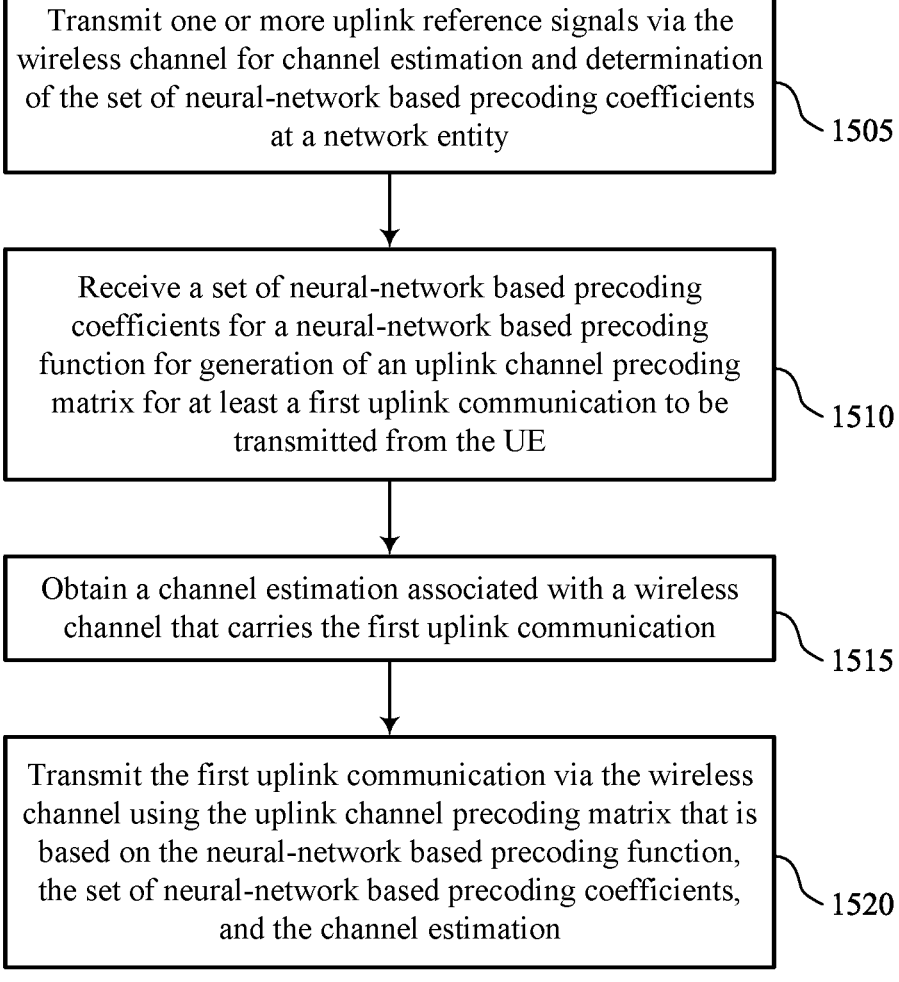

Transmit one or more uplink reference signals via the wireless channel for channel estimation and determination of the set of neural-network based precoding coefficients at a network entity

1505

Receive a set of neural-network based precoding coefficients for a neural-network based precoding function for generation of an uplink channel precoding matrix for at least a first uplink communication to be transmitted from the UE

1510

Obtain a channel estimation associated with a wireless channel that carries the first uplink communication

1515

Transmit the first uplink communication via the wireless channel using the uplink channel precoding matrix that is based on the neural-network based precoding function, the set of neural-network based precoding coefficients, and the channel estimation

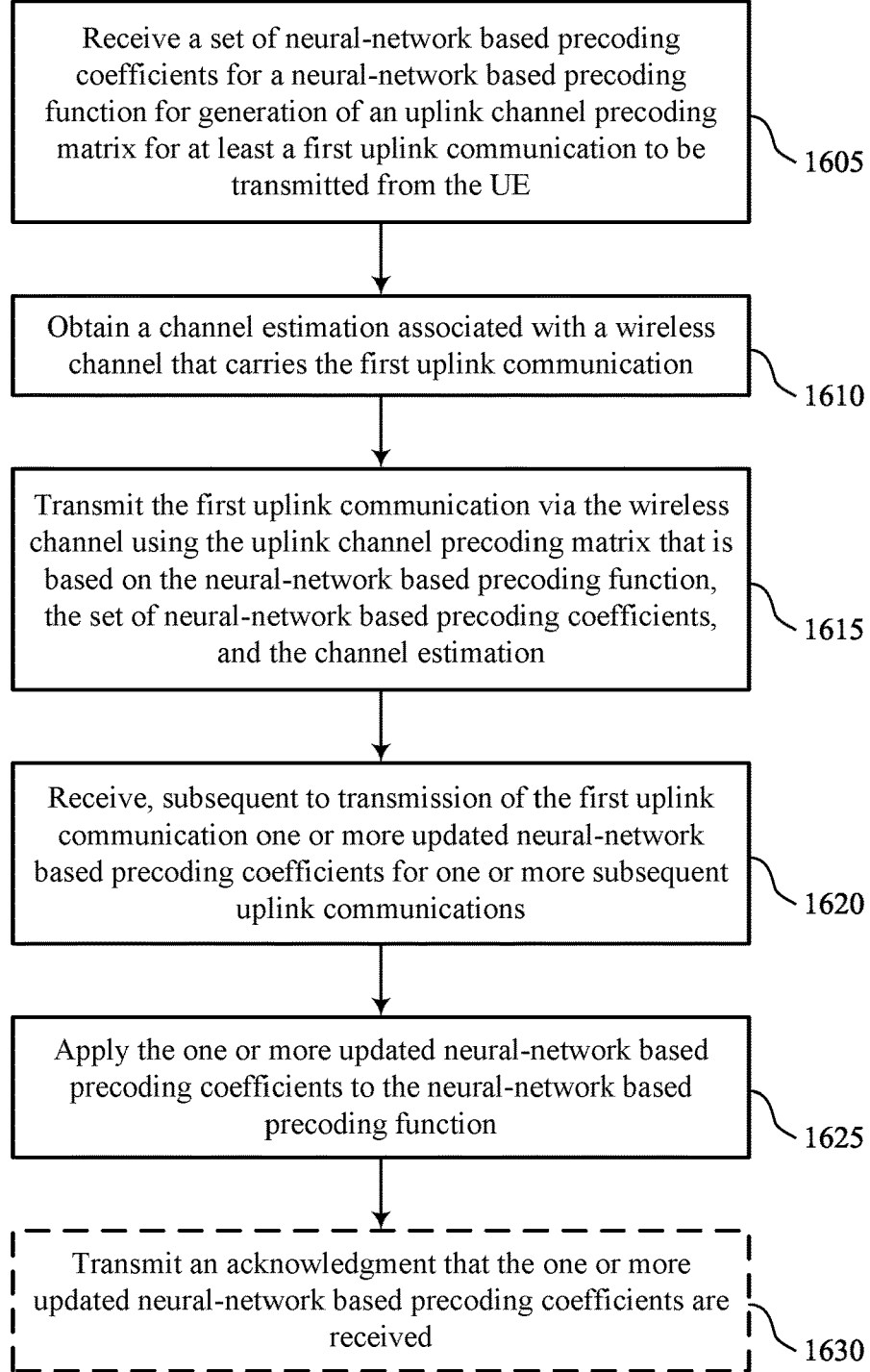

Receive a set of neural-network based precoding coefficients for a neural-network based precoding function for generation of an uplink channel precoding matrix for at least a first uplink communication to be transmitted from the UE

⎯ 1605

Obtain a channel estimation associated with a wireless channel that carries the first uplink communication

⎯ 1610

Transmit the first uplink communication via the wireless channel using the uplink channel precoding matrix that is based on the neural-network based precoding function, the set of neural-network based precoding coefficients, and the channel estimation

⎯ 1615

Receive, subsequent to transmission of the first uplink communication one or more updated neural-network based precoding coefficients for one or more subsequent uplink communications

⎯ 1620

Apply the one or more updated neural-network based precoding coefficients to the neural-network based precoding function

⎯ 1625

Transmit an acknowledgment that the one or more updated neural-network based precoding coefficients are received

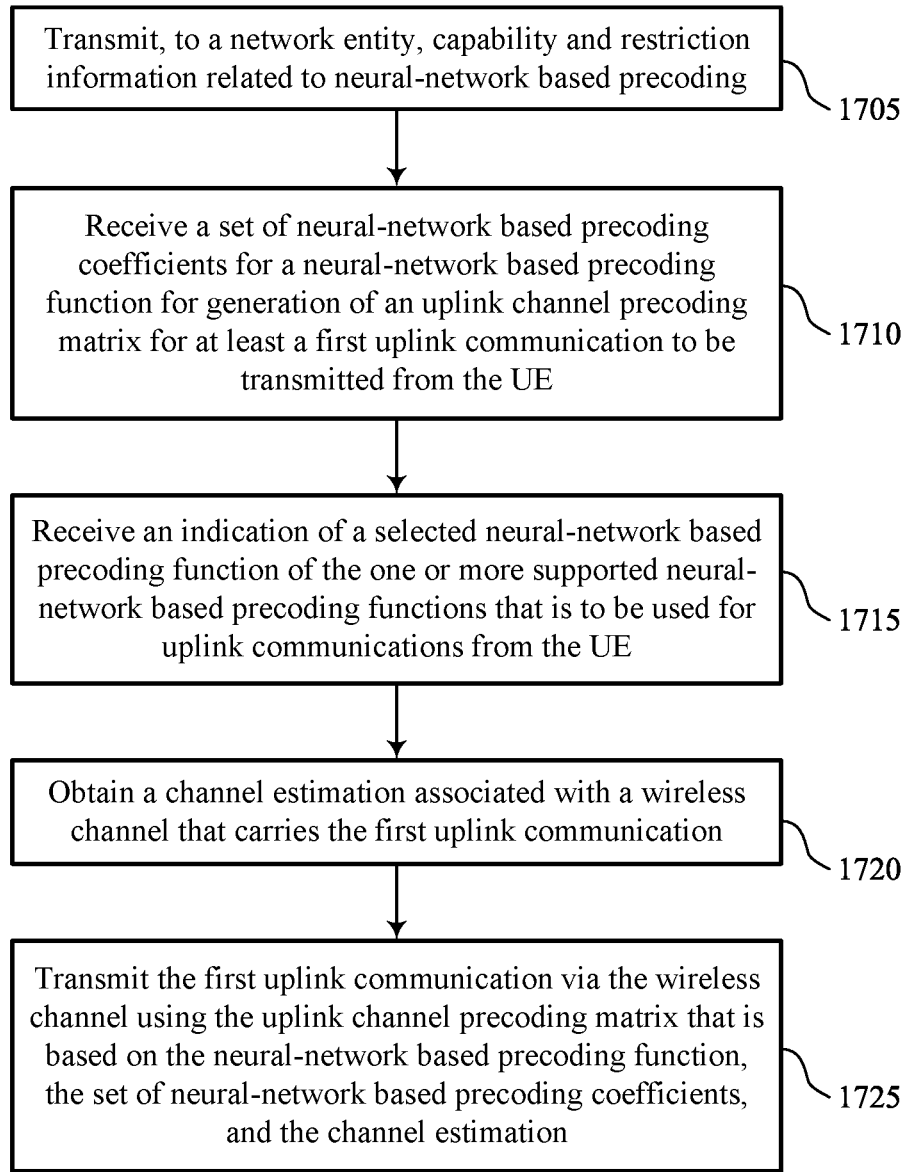

Transmit, to a network entity, capability and restriction information related to neural-network based precoding

1705

Receive a set of neural-network based precoding coefficients for a neural-network based precoding function for generation of an uplink channel precoding matrix for at least a first uplink communication to be transmitted from the UE

1710

Receive an indication of a selected neural-network based precoding function of the one or more supported neural-network based precoding functions that is to be used for uplink communications from the UE

1715

Obtain a channel estimation associated with a wireless channel that carries the first uplink communication

1720

Transmit the first uplink communication via the wireless channel using the uplink channel precoding matrix that is based on the neural-network based precoding function, the set of neural-network based precoding coefficients, and the channel estimation

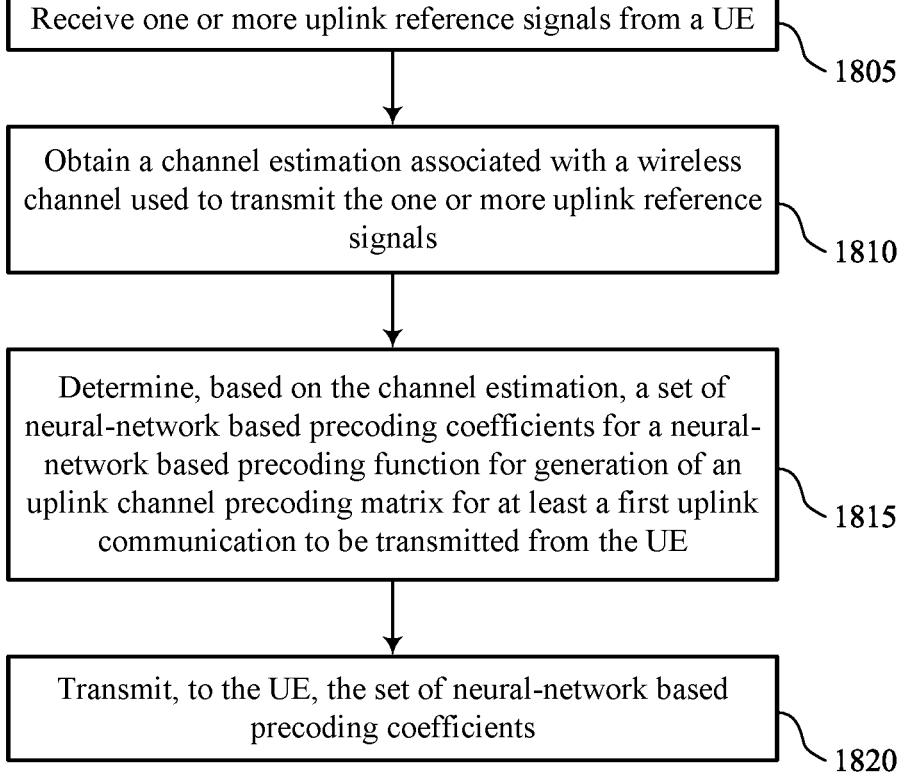

Receive one or more uplink reference signals from a UE
1805

Obtain a channel estimation associated with a wireless channel used to transmit the one or more uplink reference signals
1810

Determine, based on the channel estimation, a set of neural-network based precoding coefficients for a neural-network based precoding function for generation of an uplink channel precoding matrix for at least a first uplink communication to be transmitted from the UE
1815

Transmit, to the UE, the set of neural-network based precoding coefficients
1820

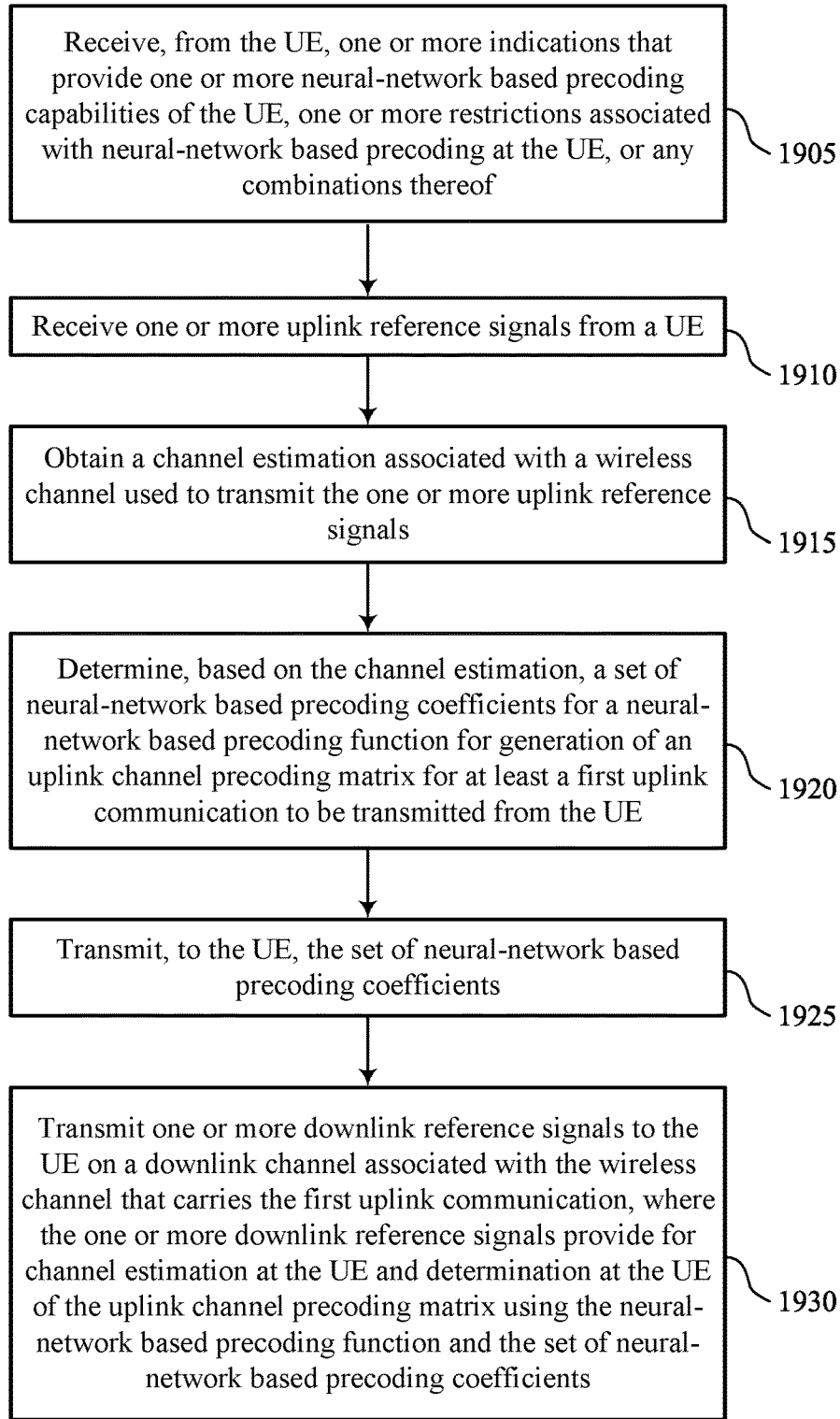

Receive, from the UE, one or more indications that provide one or more neural-network based precoding capabilities of the UE, one or more restrictions associated with neural-network based precoding at the UE, or any combinations thereof ⟩ 1905

Receive one or more uplink reference signals from a UE ⟩ 1910

Obtain a channel estimation associated with a wireless channel used to transmit the one or more uplink reference signals ⟩ 1915

Determine, based on the channel estimation, a set of neural-network based precoding coefficients for a neural-network based precoding function for generation of an uplink channel precoding matrix for at least a first uplink communication to be transmitted from the UE ⟩ 1920

Transmit, to the UE, the set of neural-network based precoding coefficients ⟩ 1925

Transmit one or more downlink reference signals to the UE on a downlink channel associated with the wireless channel that carries the first uplink communication, where the one or more downlink reference signals provide for channel estimation at the UE and determination at the UE of the uplink channel precoding matrix using the neural-network based precoding function and the set of neural-network based precoding coefficients ⟩ 1930

CHANNEL PRECODER SELECTION FOR UPLINK WIRELESS COMMUNICATIONS

FIELD OF TECHNOLOGY

The following relates to wireless communications, including channel precoder selection for uplink wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel precoder selection for uplink wireless communications. For example, the described techniques provide that machine-learning models, such as neural network (NN) based precoding functions, may be used at a user equipment (UE) to determine precoding parameters directly based on channel estimations performed at the UE. A network entity (e.g., a base station or gNB) may measure channel parameters and determine coefficients that are to be applied to a machine learning precoding function (e.g., a NN precoding function) at the UE. The UE may use the indicated coefficients in the precoding function, along with a channel estimation of a channel associated with an uplink transmission, to determine a precoding matrix that is to be applied for the uplink transmission. In some aspects, a UE may provide capabilities and restrictions associated with NN based precoding, and a network entity may determine NN coefficients based on an uplink channel estimation and the UE capabilities and restrictions. The NN coefficients may be provided to the UE, which may perform channel estimation (e.g., on downlink signals assuming channel reciprocity) and apply the channel estimation and NN coefficients to the NN precoding function to determine precoding parameters for uplink transmissions.

A method for wireless communications at a user equipment (UE) is described. The method may include receiving a set of neural-network based precoding coefficients for a neural-network based precoding function for generation of an uplink channel precoding matrix for at least a first uplink communication to be transmitted from the UE, obtaining a channel estimation associated with a wireless channel that carries the first uplink communication, and transmitting the first uplink communication via the wireless channel using the uplink channel precoding matrix that is based on the neural-network based precoding function, the set of neural-network based precoding coefficients, and the channel estimation.

An apparatus for wireless communications at a UE is described. The apparatus may include a processor, memory coupled with the processor, and instructions stored in the memory. The instructions may be executable by the processor to cause the apparatus to receive a set of neural-network based precoding coefficients for a neural-network based precoding function for generation of an uplink channel precoding matrix for at least a first uplink communication to be transmitted from the UE, obtain a channel estimation associated with a wireless channel that carries the first uplink communication, and transmit the first uplink communication via the wireless channel using the uplink channel precoding matrix that is based on the neural-network based precoding function, the set of neural-network based precoding coefficients, and the channel estimation.

Another apparatus for wireless communications at a UE is described. The apparatus may include means for receiving a set of neural-network based precoding coefficients for a neural-network based precoding function for generation of an uplink channel precoding matrix for at least a first uplink communication to be transmitted from the UE, means for obtaining a channel estimation associated with a wireless channel that carries the first uplink communication, and means for transmitting the first uplink communication via the wireless channel using the uplink channel precoding matrix that is based on the neural-network based precoding function, the set of neural-network based precoding coefficients, and the channel estimation.

A non-transitory computer-readable medium storing code for wireless communications at a UE is described. The code may include instructions executable by a processor to receive a set of neural-network based precoding coefficients for a neural-network based precoding function for generation of an uplink channel precoding matrix for at least a first uplink communication to be transmitted from the UE, obtain a channel estimation associated with a wireless channel that carries the first uplink communication, and transmit the first uplink communication via the wireless channel using the uplink channel precoding matrix that is based on the neural-network based precoding function, the set of neural-network based precoding coefficients, and the channel estimation.

Some examples of the method, apparatuses, and non-transitory computer-readable medium described herein may further include operations, features, means, or instructions for transmitting, to a network entity, one or more neural-network based precoding capabilities of the UE, one or more restrictions associated with neural-network based precoding at the UE, or any combinations thereof. Some examples of the method, apparatuses, and non-transitory computer-readable medium described herein may further include operations, features, means, or instructions for measuring one or more downlink reference signals on a downlink channel associated with the wireless channel that carries the first uplink communication and determining, responsive to measuring the one or more downlink reference signals, the uplink channel precoding matrix using the neural-network based precoding function and the set of neural-network based precoding coefficients. Some examples of the method, apparatuses, and non-transitory computer-readable medium described herein may further include operations, features, means, or instructions for transmitting one or more uplink reference signals via the wireless channel for channel estimation and determination of the set of neural-network based precoding coefficients at a network entity.

Some examples of the method, apparatuses, and non-transitory computer-readable medium described herein may further include operations, features, means, or instructions for receiving, subsequent to transmission of the first uplink communication one or more updated neural-network based precoding coefficients for one or more subsequent uplink communications. Some examples of the method, apparatuses, and non-transitory computer-readable medium described herein may further include operations, features, means, or instructions for applying the one or more updated neural-network based precoding coefficients to the neural-network based precoding function and transmitting an acknowledgment that the one or more updated neural-network based precoding coefficients are received. In some examples of the method, apparatuses, and non-transitory computer-readable medium described herein, the one or more updated neural-network based precoding coefficients may be associated with one or more layers of a multi-layered neural network precoding function.

Some examples of the method, apparatuses, and non-transitory computer-readable medium described herein may further include operations, features, means, or instructions for transmitting, to a network entity, one or more of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof. Some examples of the method, apparatuses, and non-transitory computer-readable medium described herein may further include operations, features, means, or instructions for transmitting, to a network entity, an indication of one or more supported neural-network based precoding functions from a set of available neural-network based precoding functions.

In some examples of the method, apparatuses, and non-transitory computer-readable medium described herein, the receiving the set of neural-network based precoding coefficients may include operations, features, means, or instructions for receiving an indication of a selected neural-network based precoding function of the one or more supported neural-network based precoding functions that is to be used for uplink communications from the UE. Some examples of the method, apparatuses, and non-transitory computer-readable medium described herein may further include operations, features, means, or instructions for transmitting, to a network entity, one or more of a maximum transmit power available at the UE, an allowed transmission power per antenna for one or more antennas at the UE, one or more power amplifier non-linearity parameters, or any combinations thereof.

A method for wireless communications at a network entity is described. The method may include receiving one or more uplink reference signals from a UE, obtaining a channel estimation associated with a wireless channel used to transmit the one or more uplink reference signals, determining, based on the channel estimation, a set of neural-network based precoding coefficients for a neural-network based precoding function for generation of an uplink channel precoding matrix for at least a first uplink communication to be transmitted from the UE, and transmitting, to the UE, the set of neural-network based precoding coefficients.

An apparatus for wireless communications at a network entity is described. The apparatus may include a processor, memory coupled with the processor, and instructions stored in the memory. The instructions may be executable by the processor to cause the apparatus to receive one or more uplink reference signals from a UE, obtain a channel estimation associated with a wireless channel used to transmit the one or more uplink reference signals, determine, based on the channel estimation, a set of neural-network based precoding coefficients for a neural-network based precoding function for generation of an uplink channel precoding matrix for at least a first uplink communication to be transmitted from the UE, and transmit, to the UE, the set of neural-network based precoding coefficients.

Another apparatus for wireless communications at a network entity is described. The apparatus may include means for receiving one or more uplink reference signals from a UE, means for obtaining a channel estimation associated with a wireless channel used to transmit the one or more uplink reference signals, means for determining, based on the channel estimation, a set of neural-network based precoding coefficients for a neural-network based precoding function for generation of an uplink channel precoding matrix for at least a first uplink communication to be transmitted from the UE, and means for transmitting, to the UE, the set of neural-network based precoding coefficients.

A non-transitory computer-readable medium storing code for wireless communications at a network entity is described. The code may include instructions executable by a processor to receive one or more uplink reference signals from a UE, obtain a channel estimation associated with a wireless channel used to transmit the one or more uplink reference signals, determine, based on the channel estimation, a set of neural-network based precoding coefficients for a neural-network based precoding function for generation of an uplink channel precoding matrix for at least a first uplink communication to be transmitted from the UE, and transmit, to the UE, the set of neural-network based precoding coefficients.

Some examples of the method, apparatuses, and non-transitory computer-readable medium described herein may further include operations, features, means, or instructions for receiving, from the UE, one or more indications that provide one or more neural-network based precoding capabilities of the UE, one or more restrictions associated with neural-network based precoding at the UE, or any combinations thereof, and where the set of neural-network based precoding coefficients are further determined based on the one or more indications.

Some examples of the method, apparatuses, and non-transitory computer-readable medium described herein may further include operations, features, means, or instructions for transmitting one or more downlink reference signals to the UE on a downlink channel associated with the wireless channel that carries the first uplink communication, where the one or more downlink reference signals provide for channel estimation at the UE and determination at the UE of the uplink channel precoding matrix using the neural-network based precoding function and the set of neural-network based precoding coefficients. Some examples of the method, apparatuses, and non-transitory computer-readable medium described herein may further include operations, features, means, or instructions for receiving one or more uplink transmissions from the UE and transmitting, subsequent to the one or more uplink transmissions, one or more updated neural-network based precoding coefficients for one or more subsequent uplink communications from the UE.

Some examples of the method, apparatuses, and non-transitory computer-readable medium described herein may further include operations, features, means, or instructions for receiving an acknowledgment that the one or more updated neural-network based precoding coefficients are received at the UE. In some examples of the method, apparatuses, and non-transitory computer-readable medium described herein, the one or more updated neural-network based precoding coefficients may be associated with one or more layers of a multi-layered neural network precoding function.

Some examples of the method, apparatuses, and non-transitory computer-readable medium described herein may further include operations, features, means, or instructions for receiving, from the UE, one or more indications of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof, and where the set of neural-network based precoding coefficients may be further determined based on the one or more indications.

Some examples of the method, apparatuses, and non-transitory computer-readable medium described herein may further include operations, features, means, or instructions for receiving, from the UE, an indication of one or more supported neural-network based precoding functions from a set of available neural-network based precoding functions and selecting the neural-network based precoding function for uplink channel precoding at the UE based on the one or more supported neural-network based precoding functions. Some examples of the method, apparatuses, and non-transitory computer-readable medium described herein may further include operations, features, means, or instructions for transmitting an indication of the selected neural-network based precoding function of the one or more supported neural-network based precoding functions that is to be used for uplink communications from the UE.

Some examples of the method, apparatuses, and non-transitory computer-readable medium described herein may further include operations, features, means, or instructions for receiving, from the UE, one or more indications of a maximum transmit power available at the UE, an allowed transmission power per antenna for one or more antennas at the UE, one or more power amplifier non-linearity parameters, or any combinations thereof, and where the set of neural-network based precoding coefficients may be further determined based on the one or more indications.

BRIEF DESCRIPTION OF THE DRAWINGS

FIG. 2 illustrates an example of a wireless communications system that supports channel precoder selection for uplink wireless communications in accordance with one or more aspects of the present disclosure.

FIG. 3 illustrates an example of a neural network based precoding selection that supports channel precoder selection for uplink wireless communications in accordance with one or more aspects of the present disclosure.

FIGS. 13 through 20 illustrate flowcharts showing methods that support channel precoder selection for uplink wireless communications in accordance with one or more aspects of the present disclosure.

DETAILED DESCRIPTION

Figure 1:
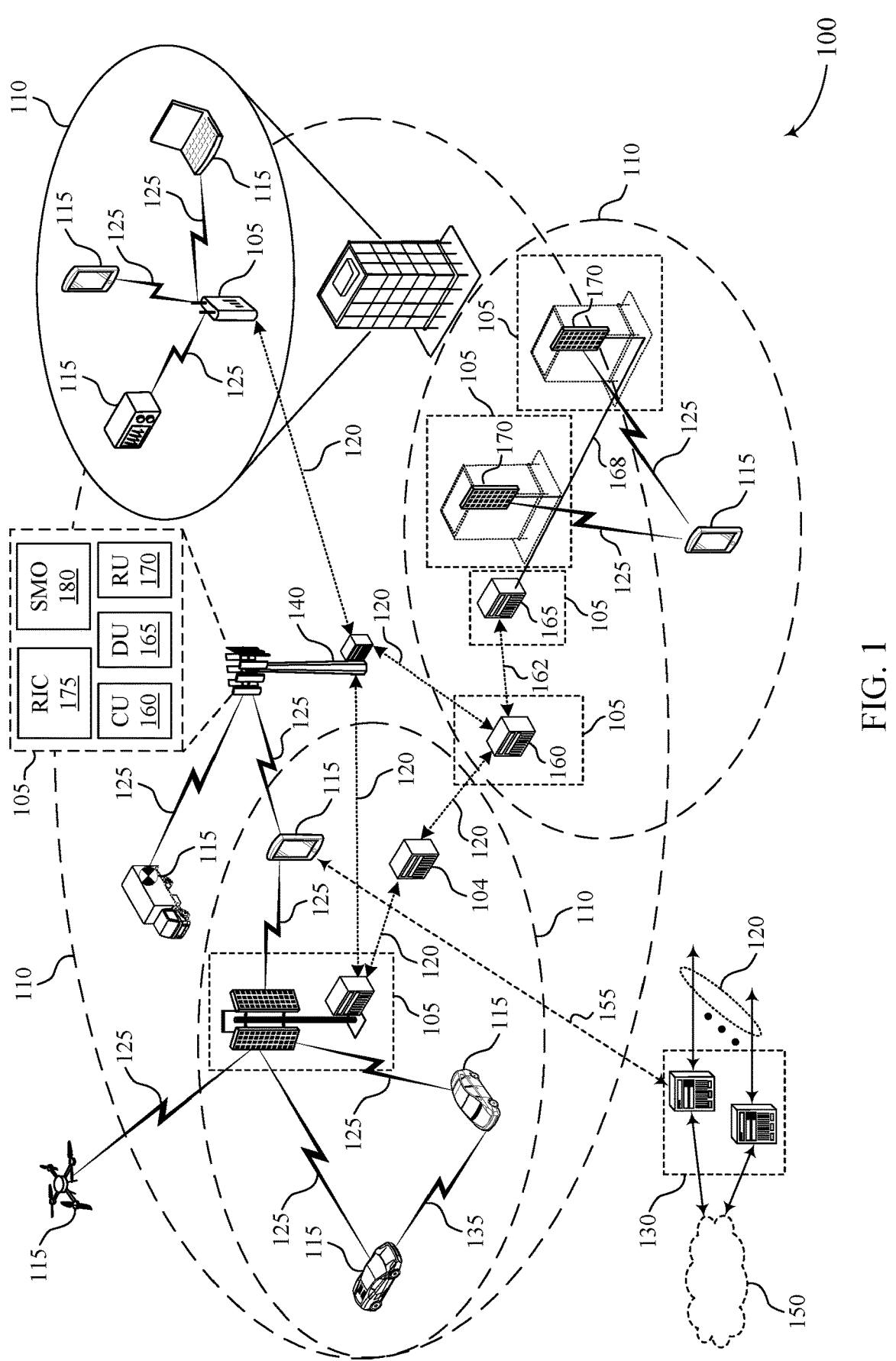
FIG. 1 illustrates an example of a wireless communications system that supports channel precoder selection for uplink wireless communications in accordance with one or more aspects of the present disclosure.

Precoding may be used in wireless communications to provide channel adaptive techniques to increase channel capacity and throughput, mitigate inter-device interference (e.g., user equipment (UE) to UE interference is multi-user multiple-input-multiple-output (MU-MIMO) communications), mitigate distortion due to low resolution digital-to-analog conversion (DAC) at a transmitter, provide for power reduction at a receiver through reduced quantity of receive antennas, and the like. In some wireless communications systems, precoding may be used for downlink communications from a network entity to a UE, for uplink communications from a UE to a network entity, or both. In some cases, for uplink precoding, a UE may provide channel information (e.g., channel state information (CSI)) to the network, and may receive an indication of precoding (e.g., in a transmitted precoder matrix indicator (TPMI) provided to the UE in downlink control information (DCI)) that is to be used for uplink transmissions. However, in cases where mobility is relatively high, channel conditions may change relatively quickly and information provided in a CSI report may become outdated prior to an updated CSI report, which may lead to degraded throughput, additional retransmissions, and increased latency. Transmission of more frequent CSI reports may help to maintain more up-to-date channel estimations, but may consume a relatively large amount of overhead associated with CSI report transmissions and indications of precoding matrix selection.

In accordance with various aspects discussed herein, efficient selection of precoding parameters for uplink transmissions are provided which may enhance communications throughput and reliability, and reduce overhead. In some cases, machine-learning models, such as neural network (NN) based precoding functions, may be used at a UE to determine precoding parameters directly based on channel estimations performed at the UE. A network entity (e.g., a base station or gNB) may measure channel parameters and determine coefficients that are to be applied to a machine learning precoding function (e.g., a NN precoding function) at the UE. The UE may use the indicated coefficients in the precoding function, along with a channel estimation of a channel associated with an uplink transmission, to determine a precoding matrix that is to be applied for the uplink transmission. In some aspects, the machine learning or NN precoding function may be used for a relatively wide range of channel estimations, and thus CSI reports may be transmitted at a reduced frequency thereby reducing overhead and power consumption. In some aspects, a UE may provide capabilities and restrictions associated with NN based precoding (e.g., supported NN dimensionality, supported precoding functions, maximum transmit power, maximum transmit power per antenna, power amplifier nonlinearities, etc.), and a network entity may determine NN coefficients based on an uplink channel estimation and the UE capabilities/restrictions. The NN coefficients may be provided to the UE, which may perform channel estimation (e.g., on downlink signals assuming channel reciprocity) and apply the channel estimation and NN coefficients to the NN precoding function to determine precoding parameters for uplink transmissions.

Particular implementations of the subject matter described in this disclosure can be implemented to realize one or more of the following potential advantages. For example, NN based precoding functions may allow for enhancement for a non-convex, multi-objective problem of precoder selection for uplink communications, provide for offloading of processing functions (e.g., NN training functions to determine NN coefficients) from a UE to a network entity, provide for enhanced support for high mobility scenarios deployments through rapid updates to a precoder for each new channel realization, provide for reduced signaling overhead, or any combinations thereof. As such, the UE may consume less battery power and achieve greater power savings, which may increase a battery life of the UE, while also supporting lower latency communication, lower overhead, enhanced data rates, and enhanced reliability.

Aspects of the disclosure are initially described in the context of wireless communications systems. Aspects of the disclosure are further illustrated by and described with reference to block diagrams, process flows, apparatus diagrams, system diagrams, and flowcharts that relate to channel precoder selection for uplink wireless communications.

FIG. 1 illustrates an example of a wireless communications system 100 that supports channel precoder selection for uplink wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support channel precoder selection for uplink wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for auto-mated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In accordance with various aspects, one or more UEs 115 and network entities 105 may use machine-learning models, such as NN based precoding functions, to determine precoding parameters based on channel estimations of a communications channel between a UE 115 and network entity 105. In some cases, a network entity 105 may measure channel parameters of a communications channel between the network entity 105 and a UE 115, and determine coefficients that are to be applied to a machine learning based precoding function (e.g., a NN based precoding function) at the UE 115. The network entity 105 may provide the coefficients to the UE 115, which may use the indicated coefficients, along with a channel estimation of a channel associated with an uplink transmission, to determine a precoding matrix that is to be applied for the uplink transmission. In some aspects, the UE 115 may provide capabilities and restrictions associated with NN based precoding (or other machine learning based precoding function), and the network entity 105 may determine NN coefficients based on an uplink channel estimation and the UE 115 capabilities and restrictions.

FIG. 2 illustrates an example of a wireless communications system 200 that supports channel precoder selection for uplink wireless communications in accordance with one or more aspects of the present disclosure. In some examples, the wireless communications system 200 may implement aspects of wireless communications system 100. For example, the wireless communications system 200 may include a network entity 105-*a* and a UE 115-*a*, which may be examples of the corresponding devices of FIG. 1. The UE 115-*a* and the network entity 105-*a* may communicate via one or more downlink carriers 205 and one or more uplink carriers 210 (e.g., using frequency division multiplexing or time division multiplexing of uplink and downlink communications).

In the example, of FIG. 2, the UE 115-*a* and the network entity 105-*a* may support NN based precoding selection, in which a precoding matrix may be selected based on a NN precoding function. The NN precoding function may use one or more NN coefficients that are applied to a NN model. A channel estimation (e.g., one or more measured parameters from a reference signal, such as a time domain channel response, a frequency domain channel response, a reference signal received power (RSRP), a signal to noise ratio (SNR), a signal to interference and noise ratio (SINR), an interference measurement, etc.) may be provided to the NN precoding function, which may output a precoding matrix that is to be used for an associated transmission.

For example, a precoding operation in OFDM may be performed in the frequency domain for MIMO communications, in which a transmitter may transmit, per subcarrier, K data values over N transmitting antennas. A linear precoding may multiply, per subcarrier (and per OFDM symbol), a vector of K data values ('x') by a K×N precoding matrix ('P') to get the vector of N values to be transmitted over the N antennas ('y'), according to y=P*x. The precoding matrix P may be common for a group of subcarriers. In accordance with various aspects discussed herein, the NN precoding function may calculate a P matrix per subcarrier or group of subcarriers, or select a P matrix from a predefined set of P matrixes, based on a channel estimation. In various aspects, support is provided for deep-learning based precoding, in which a NN based solution can be trained to provide a precoding matrix that is enhanced based on one or more desired criteria under one or more restrictions at the UE 115-*a*.

In some cases, the UE 115-*a* may transmit a capability indication 215 to the network entity 105-*a*. For example, the capability indication 215 may be provided in radio resource control (RRC) signaling, in uplink control information (UCI), in a medium access control (MAC) control element (CE), or any combinations thereof. In some cases, the capability indication 215 may include one or more of supported NN dimensionality capabilities (e.g., a quantity of NN layers supported at the UE 115-*a*, layer connectivity, an indication of one or more predefined NN structures supported at the UE 115-*a*, etc.), supported precoders for selection (e.g., a subset of precoders of a set of predefined precoders, an indication of one or more supported precoders that may be outputted from the NN, etc.), or one or more restrictions of the UE 115-*a* that may provide for optimization of a precoder (e.g., overall allowed transmission power, allowed transmission power per antenna, power amplifier nonlinearities, etc.).

Based on the capability indication 215 provided by the UE 115-*a*, the network entity 105-*a* may determine one or more precoding function coefficients using machine learning. For example, NN based machine learning may be used to determine one or more NN coefficients 225 that may be transmitted to the UE 115-*a*. In some cases, the NN coefficients 225 may be determined based on one or more channel measurements of the uplink carrier 210, such as based on measurements of a sounding reference signal (SRS) 220 transmitted by the UE 115-*a*. The UE 115-*a* may use the indicated NN coefficients 225 in a NN based precoding function to determine a precoding matrix that is to be applied to one or more uplink transmissions 235. In some cases, the UE 115-*a* may perform a channel estimation for the uplink carrier 210, such as based on one or more reference signals measured from one or more downlink transmissions 230 from the network entity 105-*a* and assuming that channel reciprocity exists between the uplink carrier 210 and the downlink carrier 205.

In some cases, the network entity 105-*a* may perform one or more updates to one or more coefficients, such as based on further channel measurements of SRS 220 transmissions, and may provide a coefficients update 240 to the UE 115-*a*. The UE 115-*a* may update the NN based precoding function accordingly, and determine a new precoding matrix for one or more subsequent uplink transmissions 235. In some cases, the coefficients update 240 may provide an indication of one or more NN layers that are to be updated of a multi-layer NN precoding function, and associated updated coefficient values. In some cases, NN coefficients 225, the coefficients update 240, or both, may indicate a set of precoders that are available for selection. For example, an indication of one or more index values from a set of defined precoders may be available for selection at the UE 115-*a*, where the set of defined precoders may be prespecified or defined by the network entity. In some cases, the network entity 105-*a* may indicate that any linear precoder may be selected at the UE 115-*a*.

FIG. 3 illustrates an example of a NN based precoding selection 300 that supports channel precoder selection for uplink wireless communications in accordance with one or more aspects of the present disclosure. The NN based precoding selection 300 may implement or be implemented to realize aspects of the wireless communications system 100 or the wireless communications system 200. For example, a UE 115-*b* and a network entity 105-*b*, which may be examples of corresponding devices as illustrated by and described with reference to FIGS. 1 and 2, may communicate using precoding matrices based on NN coefficients in accordance with techniques as discussed herein.

In the example of FIG. 3, UE 115-*b* may receive information 305 into a transmit buffer for transmission (e.g., for transmission in one or more physical uplink shared channel (PUSCH) transmissions). The information 305 may be encoded at a digital encoder 310, and precoding 315 may be applied to the encoded signal. As discussed with reference to FIG. 2, precoding 315 may be performed using a precoding matrix that is identified by NN based precoder selection component 325. The precoded signal may then be provided to RF components 320 (e.g., power amplifiers, antennas, etc.) for transmission over the air via a wireless channel having channel and noise 330 characteristics.

The network entity 105-*b* may receive the transmission and perform channel and noise estimation 335. The received signals may be provided to a demodulation component 340, and the demodulated signal decoded at digital decoder 345 to provide an output information signal. In accordance with various aspects, the parameters from the channel and noise estimation 335 may be provided to a NN training component 350, which may perform NN training based on the estimated channel and noise and may generate a set of NN coefficients 355, which may be indicated to the UE 115-*b* and used at the NN based precoder selection component 325 for selection of the precoding matrix.

In some cases, the NN training component 350 may provide deep-learning based precoding function training to determine a NN based solution that may be optimized desired criteria under one or more restrictions associated with the UE 115-*b* (e.g., transmit power restrictions, PA nonlinearities, etc.). Moreover, communication of the NN coefficients 355 between the network entity 105-*b* and the UE 115-*b* may be used for cross-training of the network as well as reduction of precoding signaling overhead, as a quantity of transmitted CSI reports may be reduced along with a quantity of control signaling to signal precoding matrices to be used for uplink communications (e.g., TPMI indications). Such NN precoding function training at the network entity 105-*b* may allow for potential optimization for a non-convex, multi-objective problem of precoder selection for uplink communications, while also offloading processing from UE 115-*b* to the network entity 105-*b*. Such techniques may allow the processing intense task of training of the NN to be offloaded from the UE 115-*b* and performed at the network entity 105-*b*, and the UE 115-*b* may use the trained NN for new channel and noise realizations to generate precoding matrices. Such techniques may provide enhanced reliability and efficiency, for example, in high mobility scenarios, where the UE 115-*b* may use the trained NN to rapidly update the precoder (e.g., at a slot-based resolution) by applying the trained NN for each new channel realization (e.g., based on a channel estimation using downlink signals). Additionally, such techniques may allow for reduced signaling overhead, as the update of the NN coefficients may have a relatively low periodicity (e.g., infrequently updated, or it may even remain constant for an entire communication session), even for high mobility scenarios.

Figure 4:
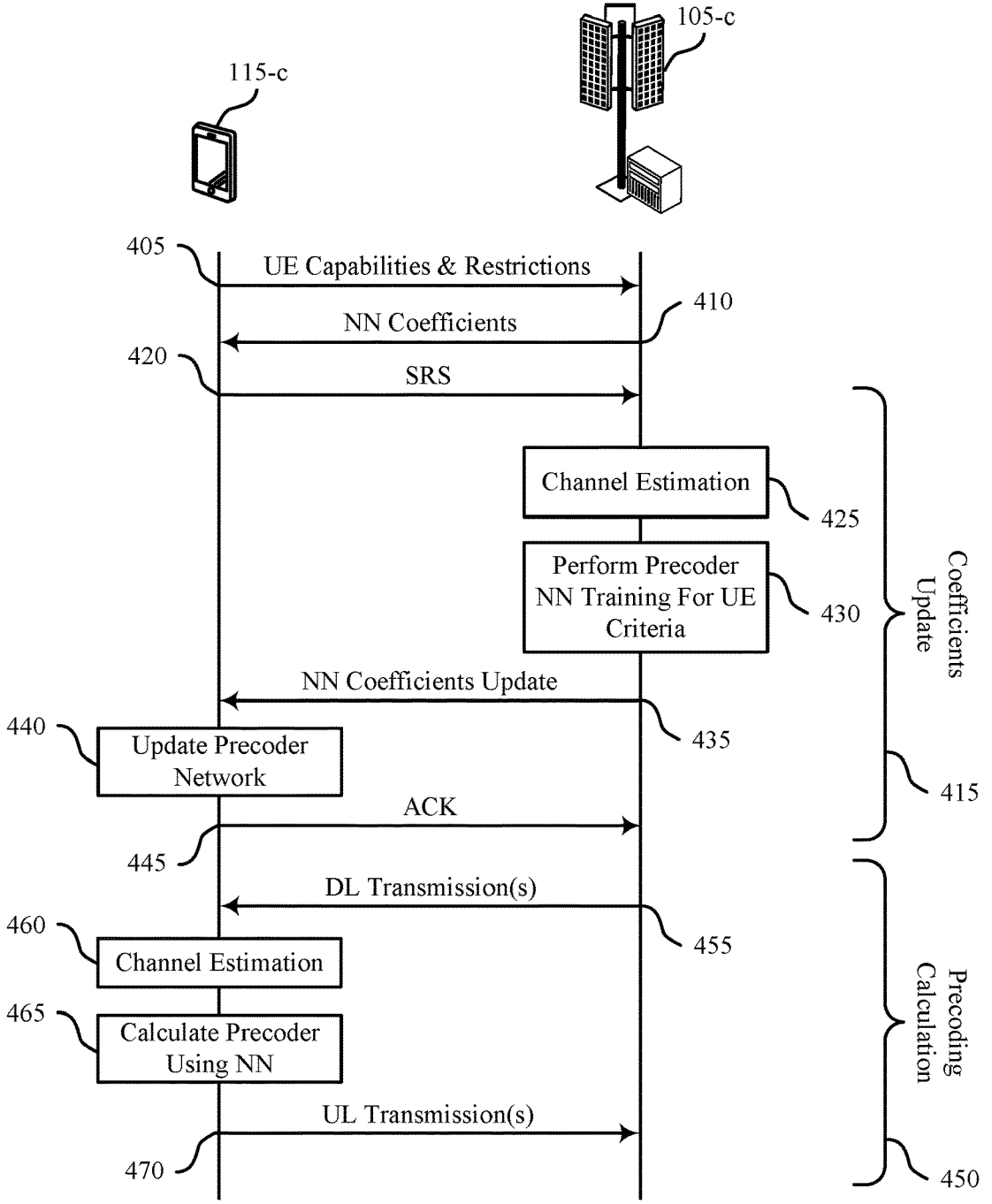
FIG. 4 illustrates an example of a process flow that supports channel precoder selection for uplink wireless communications in accordance with one or more aspects of the present disclosure.

FIG. 4 illustrates an example of a process flow 400 that supports channel precoder selection for uplink wireless communications in accordance with one or more aspects of the present disclosure. The process flow 400 may implement or be implemented by aspects of the wireless communications system 100, the wireless communications system 200, or the NN based precoding selection 300. For example, the process flow 400 illustrates communication between a UE 115-*c* and a network entity 105-*c*, which may be examples of corresponding devices as illustrated by and described with reference to FIGS. 1 through 3. In some implementations, the UE 115-*c* and the network entity 105-*c* may support NN based precoding selection for uplink communications.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 405, the UE 115-*c* may transmit, and the network entity 105-*c* may receive, an indication of UE capabilities and restrictions related to NN based precoding selection. For example, the UE 115-*c* may provide (e.g., via RRC signaling, UCI, MAC-CE, or any combinations thereof) an indication of one or more of: supported NN dimensionality capabilities (e.g., a number of NN layers supported, layer connectivity, an indication of one or more predefined NN structures supported, etc.); supported precoders for selection (e.g., a subset of precoders of a set of predefined precoders, an indication of one or more supported precoders that may be outputted from the NN, etc.); and/or one or more restrictions that may provide for better precoder selection (e.g., overall allowed transmission power, allowed transmission power per antenna, PA nonlinearities, etc.).

At 410, the network entity 105-*c* may transmit a set of NN coefficients that may be received at the UE 115-*c*. In some cases, the network entity 105-*c* may determine one or more NN coefficients by training a NN precoding function to generate a precoding matrix that is based on the channel and noise present on an uplink channel, and the one or more UE capabilities and restrictions. The trained NN precoding function may be defined by the set of NN coefficients and the associated NN structure (e.g., number of NN layers and connectivity of layers). The channel and noise estimate may be determined, for example, based on one or more estimates from uplink transmissions from the UE 115-*c*.

In some cases, one or more NN coefficients may be updated based on a coefficients update procedure 415. In some aspects, at 420, the UE 115-*c* may transmit one or more SRS transmissions (or other uplink reference signal transmissions) that may be measured at the network entity 105-*c*. At 425, the network entity 105-*c* may perform channel estimation for the uplink channel. At 430, the network entity 105-*c* may perform precoder NN training for the UE criteria based on the channel estimation. Based on the precover NN training, the network entity 105-*c* may, at 435, transmit NN coefficients update 435 to the UE 115-*c*. At 440, the UE 115-*c* may update the precoder NN using the updated coefficients and, at 445, may transmit an acknowledgment of the NN update to the network entity 105-*c*.

The UE 115-*c* may then determine a precoder according to a precoding calculation procedure 450. In this example, at 455 the network entity 105-*c* may transmit, and the UE 115-*c* may receive, one or more downlink transmissions. In some cases, the downlink transmissions may include one or more reference signals (e.g., CSI reference signals, demodulation reference signals, etc.), that may be measured at the UE 115-*c*. At 460, the UE 115-*c* may perform channel estimation based on the downlink transmissions, and may determine one or more channel parameters (e.g., RSRP, received signal strength indicator (RSSI), interference measurement, SNR, SINR, etc.). At 465, the UE 115-*c* may calculate a precoder using the NN based precoding function. For example, the NN based precoding function may identify a precoding matrix that is to be applied for one or more uplink transmissions. At 470, the UE 115-*c* may transmit, and the network entity 105-*c* may receive, one or more uplink transmissions that are precoded according to the determined precoding matrix.

Figure 5:
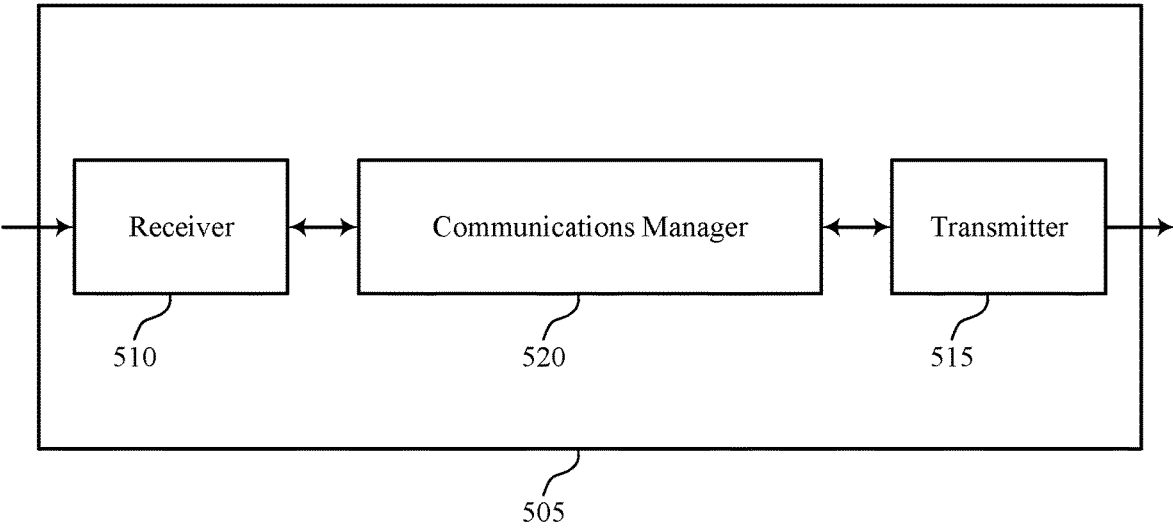
FIGS. 5 and 6 illustrate block diagrams of devices that support channel precoder selection for uplink wireless communications in accordance with one or more aspects of the present disclosure.

FIG. 5 illustrates a block diagram 500 of a device 505 that supports channel precoder selection for uplink wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to channel precoder selection for uplink wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel precoder selection for uplink wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel precoder selection for uplink wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving a set of neural-network based precoding coefficients for a neural-network based precoding function for generation of an uplink channel precoding matrix for at least a first uplink communication to be transmitted from the UE. The communications manager 520 may be configured as or otherwise support a means for obtaining a channel estimation associated with a wireless channel that carries the first uplink communication. The communications manager 520 may be configured as or otherwise support a means for transmitting the first uplink communication via the wireless channel using the uplink channel precoding matrix that is based on the neural-network based precoding function, the set of neural-network based precoding coefficients, and the channel estimation.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for NN based precoder selection to provide enhanced support for high mobility scenarios deployments through rapid updates to a precoder for each new channel realization, provide for reduced signaling overhead, provide for reduced processing resources for UEs, and thereby enhance network efficiency and reliability.

Figure 6:
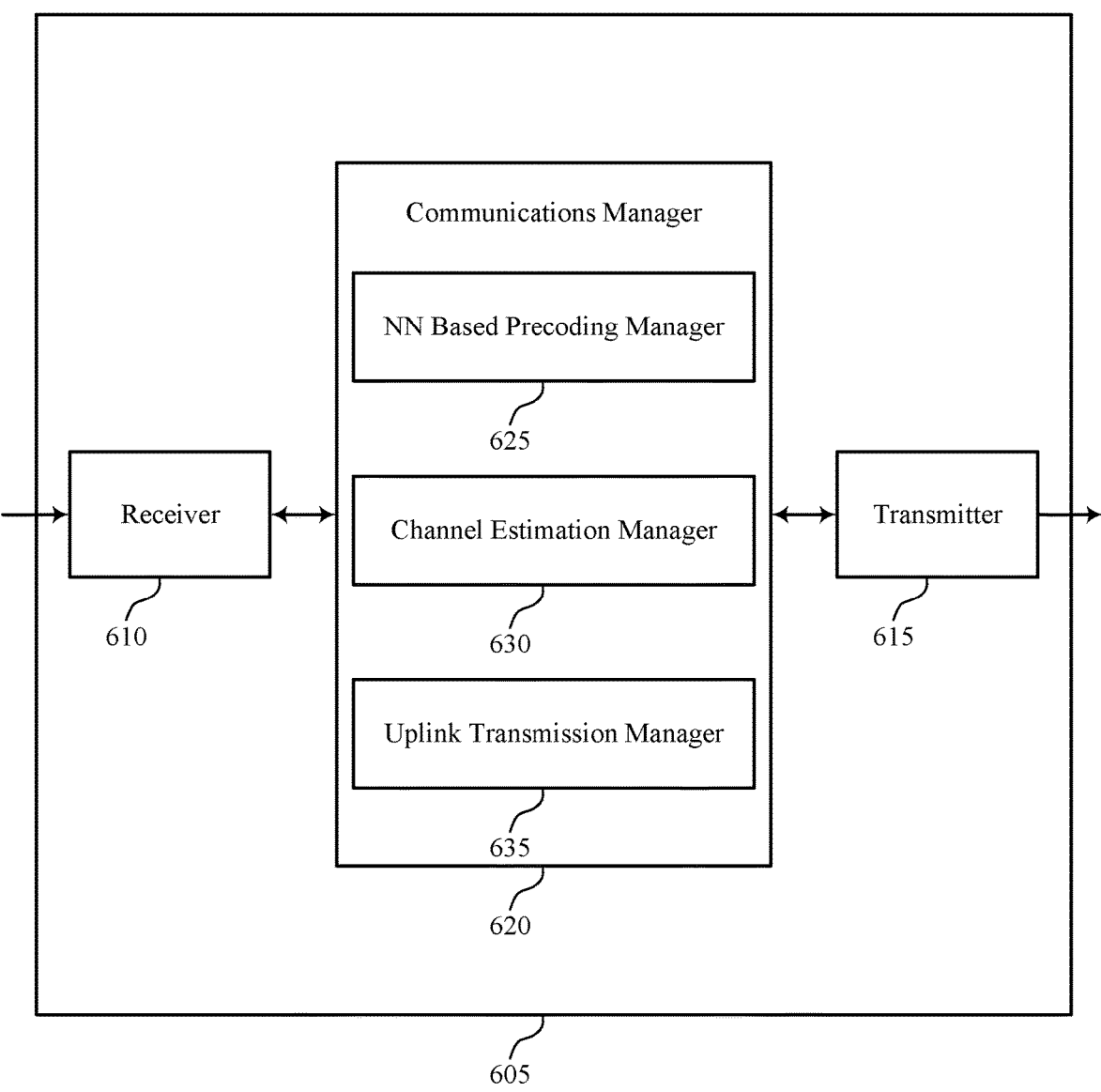

FIG. 6 illustrates a block diagram 600 of a device 605 that supports channel precoder selection for uplink wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel precoder selection for uplink wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel precoder selection for uplink wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of channel precoder selection for uplink wireless communications as described herein. For example, the communications manager 620 may include an NN based precoding manager

625, a channel estimation manager 630, an uplink transmission manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The NN based precoding manager 625 may be configured as or otherwise support a means for receiving a set of neural-network based precoding coefficients for a neural-network based precoding function for generation of an uplink channel precoding matrix for at least a first uplink communication to be transmitted from the UE. The channel estimation manager 630 may be configured as or otherwise support a means for obtaining a channel estimation associated with a wireless channel that carries the first uplink communication. The uplink transmission manager 635 may be configured as or otherwise support a means for transmitting the first uplink communication via the wireless channel using the uplink channel precoding matrix that is based on the neural-network based precoding function, the set of neural-network based precoding coefficients, and the channel estimation.

Figure 7:
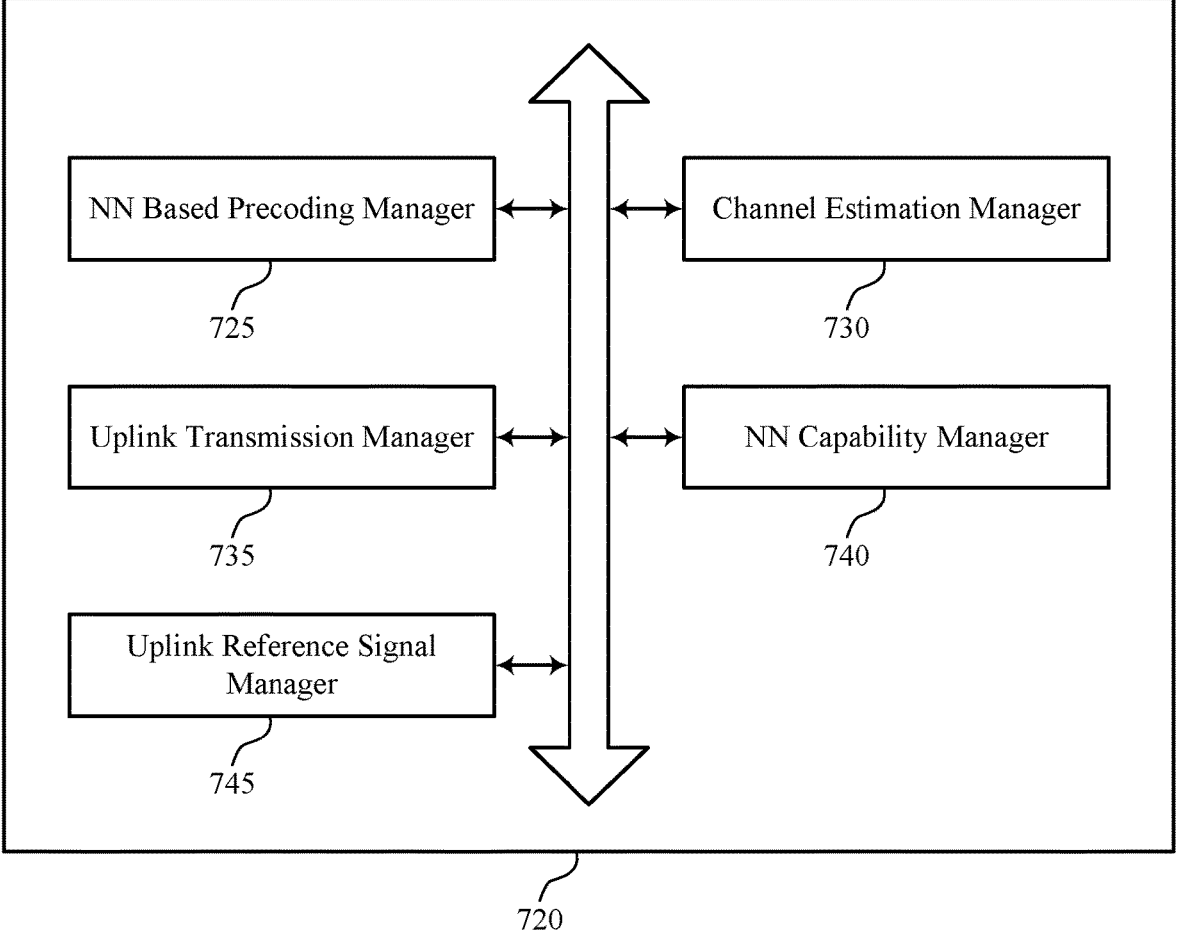
FIG. 7 illustrates a block diagram of a communications manager that supports channel precoder selection for uplink wireless communications in accordance with one or more aspects of the present disclosure.

FIG. 7 illustrates a block diagram 700 of a communications manager 720 that supports channel precoder selection for uplink wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of channel precoder selection for uplink wireless communications as described herein. For example, the communications manager 720 may include an NN based precoding manager 725, a channel estimation manager 730, an uplink transmission manager 735, an NN capability manager 740, an uplink reference signal manager 745, or any combination thereof. Each of these components may communicate, directly or indirectly, with one another (e.g., via one or more buses).

The communications manager 720 may support wireless communications at a UE in accordance with examples as disclosed herein. The NN based precoding manager 725 may be configured as or otherwise support a means for receiving a set of neural-network based precoding coefficients for a neural-network based precoding function for generation of an uplink channel precoding matrix for at least a first uplink communication to be transmitted from the UE. The channel estimation manager 730 may be configured as or otherwise support a means for obtaining a channel estimation associated with a wireless channel that carries the first uplink communication. The uplink transmission manager 735 may be configured as or otherwise support a means for transmitting the first uplink communication via the wireless channel using the uplink channel precoding matrix that is based on the neural-network based precoding function, the set of neural-network based precoding coefficients, and the channel estimation.

In some examples, the NN capability manager 740 may be configured as or otherwise support a means for transmitting, to a network entity, one or more neural-network based precoding capabilities of the UE, one or more restrictions associated with neural-network based precoding at the UE, or any combinations thereof.

In some examples, the channel estimation manager 730 may be configured as or otherwise support a means for measuring one or more downlink reference signals on a downlink channel associated with the wireless channel that carries the first uplink communication. In some examples, the NN based precoding manager 725 may be configured as or otherwise support a means for determining, responsive to measuring the one or more downlink reference signals, the uplink channel precoding matrix using the neural-network based precoding function and the set of neural-network based precoding coefficients.

In some examples, the uplink reference signal manager 745 may be configured as or otherwise support a means for transmitting one or more uplink reference signals via the wireless channel for channel estimation and determination of the set of neural-network based precoding coefficients at a network entity.

In some examples, the NN based precoding manager 725 may be configured as or otherwise support a means for receiving, subsequent to transmission of the first uplink communication one or more updated neural-network based precoding coefficients for one or more subsequent uplink communications.

In some examples, the NN based precoding manager 725 may be configured as or otherwise support a means for applying the one or more updated neural-network based precoding coefficients to the neural-network based precoding function. In some examples, the NN based precoding manager 725 may be configured as or otherwise support a means for transmitting an acknowledgment that the one or more updated neural-network based precoding coefficients are received. In some examples, the one or more updated neural-network based precoding coefficients are associated with one or more layers of a multi-layered neural network precoding function.

In some examples, the NN capability manager 740 may be configured as or otherwise support a means for transmitting, to a network entity, one or more of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof.

In some examples, the NN capability manager 740 may be configured as or otherwise support a means for transmitting, to a network entity, an indication of one or more supported neural-network based precoding functions from a set of available neural-network based precoding functions.

In some examples, to support receiving the set of neural-network based precoding coefficients, the NN based precoding manager 725 may be configured as or otherwise support a means for receiving an indication of a selected neural-network based precoding function of the one or more supported neural-network based precoding functions that is to be used for uplink communications from the UE.

In some examples, the NN capability manager 740 may be configured as or otherwise support a means for transmitting, to a network entity, one or more of a maximum transmit power available at the UE, an allowed transmission power per antenna for one or more antennas at the UE, one or more power amplifier non-linearity parameters, or any combinations thereof.

Figure 8:
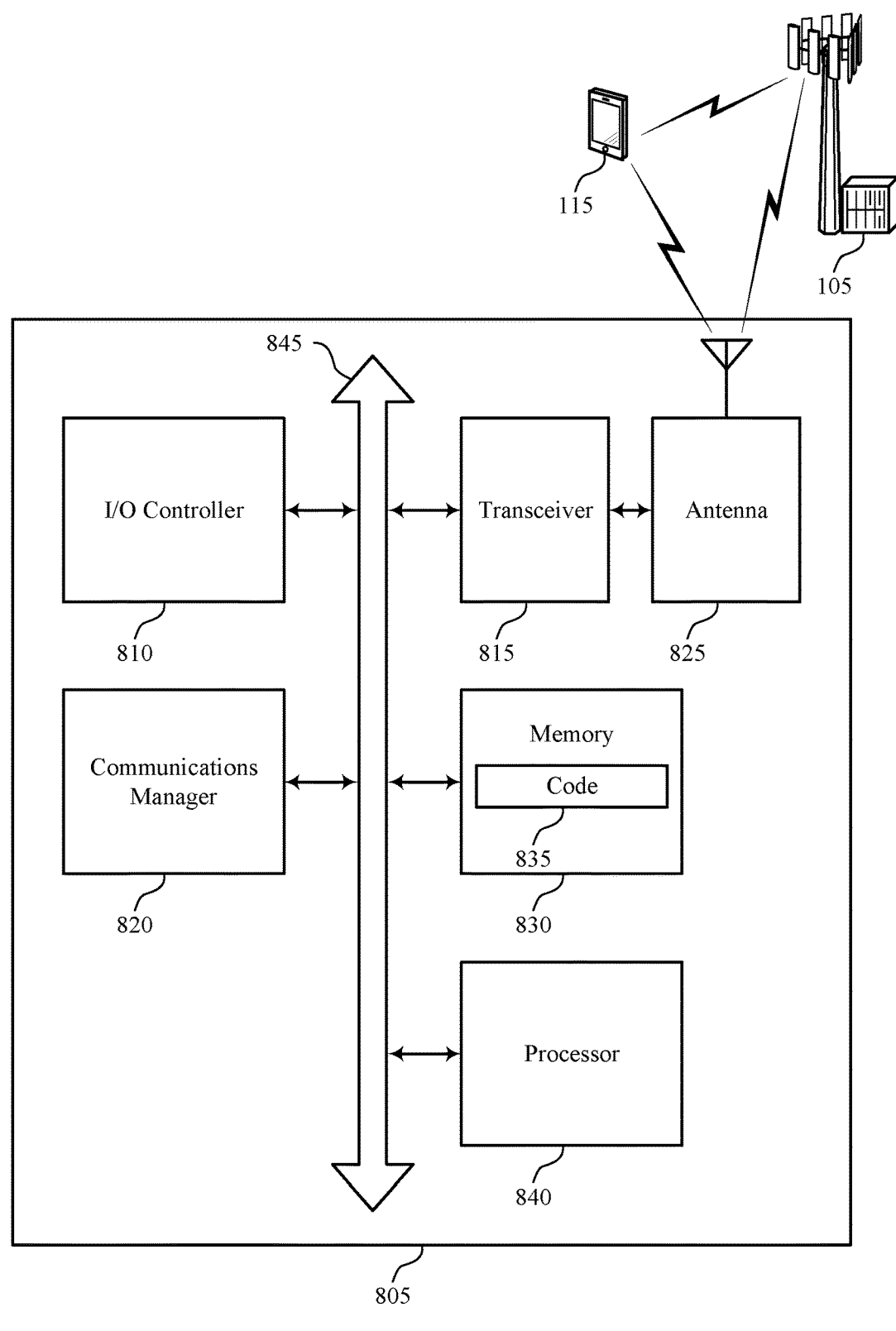
FIG. 8 illustrates a diagram of a system including a device that supports channel precoder selection for uplink wireless communications in accordance with one or more aspects of the present disclosure.

FIG. 8 illustrates a diagram of a system 800 including a device 805 that supports channel precoder selection for uplink wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel precoder selection for uplink wireless communications). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a set of neural-network based precoding coefficients for a neural-network based precoding function for generation of an uplink channel precoding matrix for at least a first uplink communication to be transmitted from the UE. The communications manager 820 may be configured as or otherwise support a means for obtaining a channel estimation associated with a wireless channel that carries the first uplink communication. The communications manager 820 may be configured as or otherwise support a means for transmitting the first uplink communication via the wireless channel using the uplink channel precoding matrix that is based on the neural-network based precoding function, the set of neural-network based precoding coefficients, and the channel estimation.

By including or configuring the communications manager 820 in accordance with examples as described herein, the device 805 may support techniques for NN based precoder selection to provide enhanced support for high mobility scenarios deployments through rapid updates to a precoder for each new channel realization, provide for reduced signaling overhead, provide for reduced processing resources for UEs, and thereby enhance network efficiency and reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel precoder selection for uplink wireless communications as described herein, or the processor 840 and the memory 830 may be otherwise configured to perform or support such operations.

Figure 9:
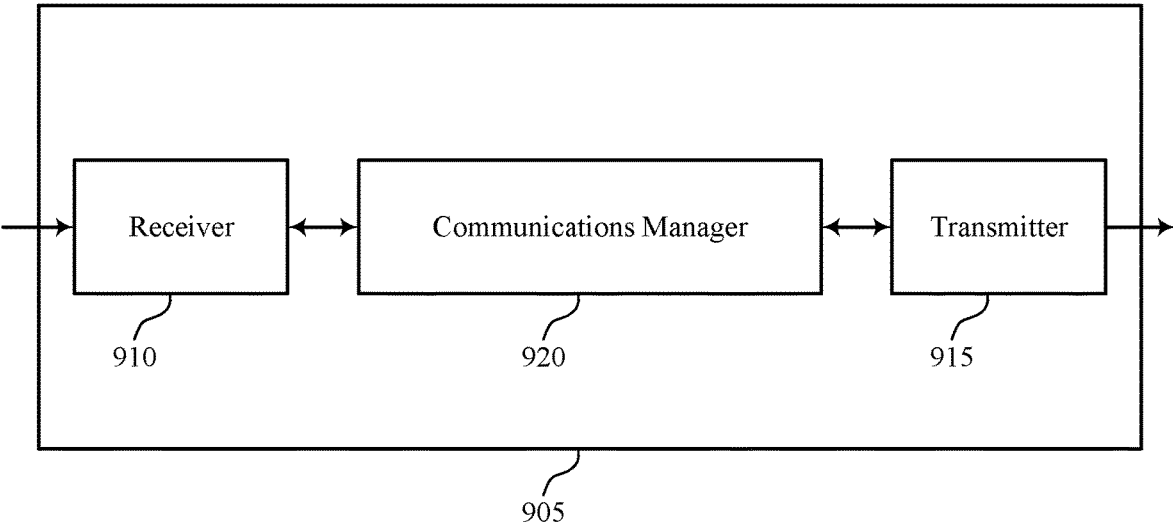
FIGS. 9 and 10 illustrate block diagrams of devices that support channel precoder selection for uplink wireless communications in accordance with one or more aspects of the present disclosure.

FIG. 9 illustrates a block diagram 900 of a device 905 that supports channel precoder selection for uplink wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of channel precoder selection for uplink wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for receiving one or more uplink reference signals from a UE. The communications manager 920 may be configured as or otherwise support a means for obtaining a channel estimation associated with a wireless channel used to transmit the one or more uplink reference signals. The communications manager 920 may be configured as or otherwise support a means for determining, based on the channel estimation, a set of neural-network based precoding coefficients for a neural-network based precoding function for generation of an uplink channel precoding matrix for at least a first uplink communication to be transmitted from the UE. The communications manager 920 may be configured as or otherwise support a means for transmitting, to the UE, the set of neural-network based precoding coefficients.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for NN based precoder selection to provide enhanced support for high mobility scenarios deployments through rapid updates to a precoder for each new channel realization, provide for reduced signaling overhead, provide for reduced processing resources for UEs, and thereby enhance network efficiency and reliability.

Figure 10:
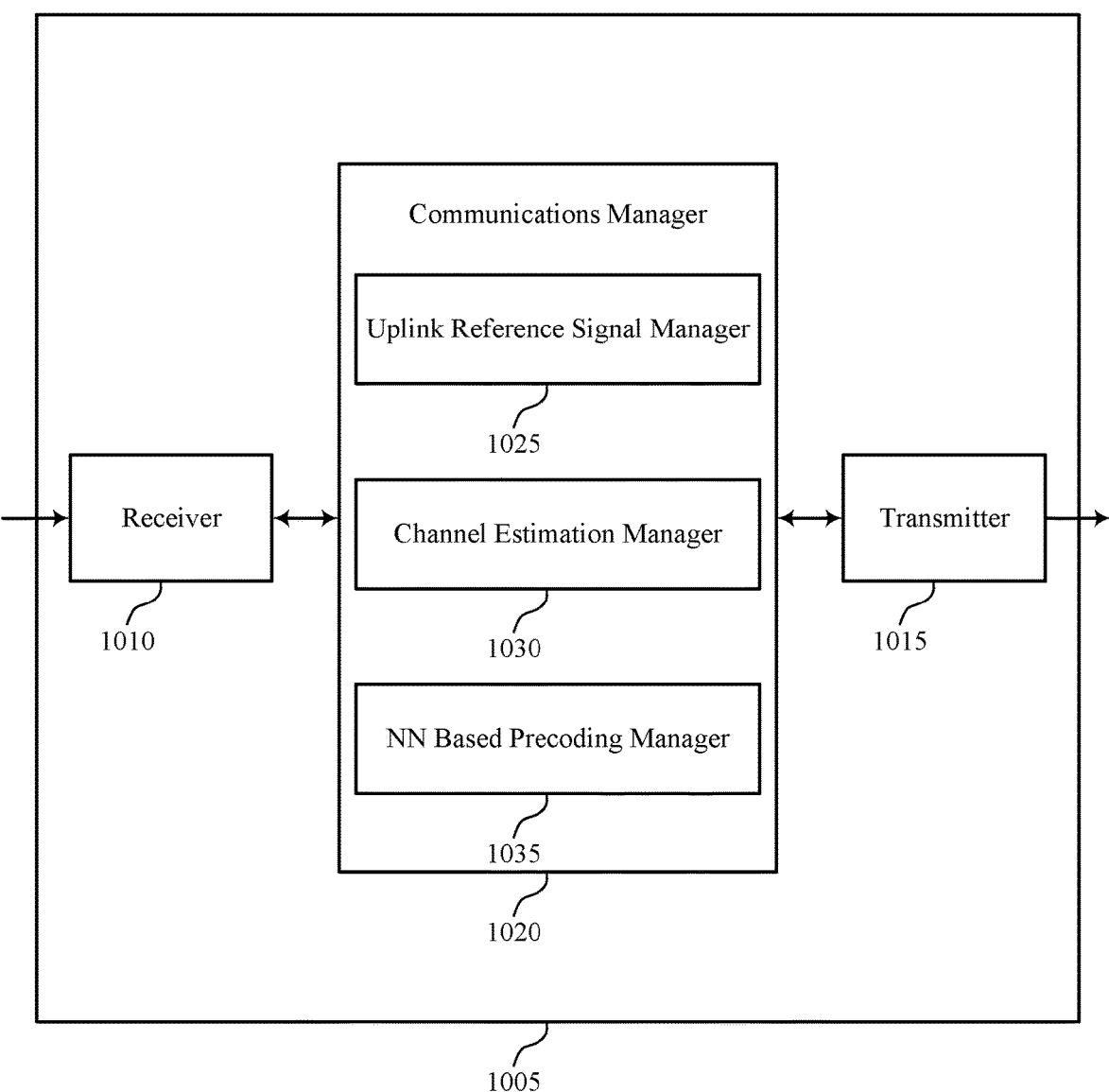

FIG. 10 illustrates a block diagram 1000 of a device 1005 that supports channel precoder selection for uplink wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas.

Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of channel precoder selection for uplink wireless communications as described herein. For example, the communications manager 1020 may include an uplink reference signal manager 1025, a channel estimation manager 1030, an NN based precoding manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The uplink reference signal manager 1025 may be configured as or otherwise support a means for receiving one or more uplink reference signals from a UE. The channel estimation manager 1030 may be configured as or otherwise support a means for obtaining a channel estimation associated with a wireless channel used to transmit the one or more uplink reference signals. The NN based precoding manager 1035 may be configured as or otherwise support a means for determining, based on the channel estimation, a set of neural-network based precoding coefficients for a neural-network based precoding function for generation of an uplink channel precoding matrix for at least a first uplink communication to be transmitted from the UE. The NN based precoding manager 1035 may be configured as or otherwise support a means for transmitting, to the UE, the set of neural-network based precoding coefficients.

Figure 11:
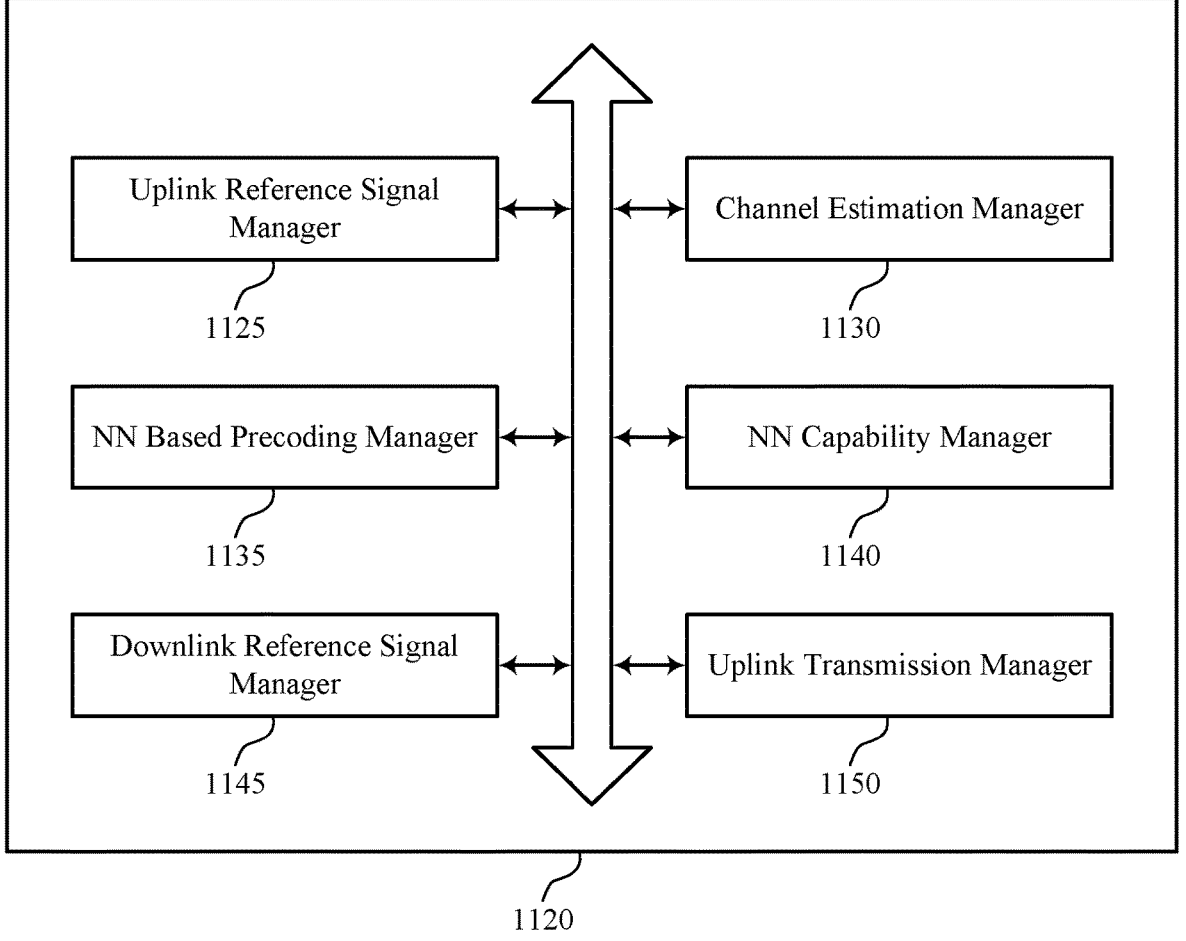
FIG. 11 illustrates a block diagram of a communications manager that supports channel precoder selection for uplink wireless communications in accordance with one or more aspects of the present disclosure.

FIG. 11 illustrates a block diagram 1100 of a communications manager 1120 that supports channel precoder selection for uplink wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of channel precoder selection for uplink wireless communications as described herein. For example, the communications manager 1120 may include an uplink reference signal manager 1125, a channel estimation manager 1130, an NN based precoding manager 1135, an NN capability manager 1140, a downlink reference signal manager 1145, an uplink transmission manager 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The uplink reference signal manager 1125 may be configured as or otherwise support a means for receiving one or more uplink reference signals from a UE. The channel estimation manager 1130 may be configured as or otherwise support a means for obtaining a channel estimation associated with a wireless channel used to transmit the one or more uplink reference signals. The NN based precoding manager 1135 may be configured as or otherwise support a means for determining, based on the channel estimation, a set of neural-network based precoding coefficients for a neural-network based precoding function for generation of an uplink channel precoding matrix for at least a first uplink communication to be transmitted from the UE. In some examples, the NN based precoding manager 1135 may be configured as or otherwise support a means for transmitting, to the UE, the set of neural-network based precoding coefficients.

In some examples, the NN capability manager 1140 may be configured as or otherwise support a means for receiving, from the UE, one or more indications that provide one or more neural-network based precoding capabilities of the UE, one or more restrictions associated with neural-network based precoding at the UE, or any combinations thereof, and where the set of neural-network based precoding coefficients are further determined based on the one or more indications.

In some examples, the downlink reference signal manager 1145 may be configured as or otherwise support a means for transmitting one or more downlink reference signals to the UE on a downlink channel associated with the wireless channel that carries the first uplink communication, where the one or more downlink reference signals provide for channel estimation at the UE and determination at the UE of the uplink channel precoding matrix using the neural-network based precoding function and the set of neural-network based precoding coefficients.

In some examples, the uplink transmission manager 1150 may be configured as or otherwise support a means for receiving one or more uplink transmissions from the UE. In some examples, the NN based precoding manager 1135 may be configured as or otherwise support a means for transmitting, subsequent to the one or more uplink transmissions, one or more updated neural-network based precoding coefficients for one or more subsequent uplink communications from the UE.

In some examples, the NN based precoding manager 1135 may be configured as or otherwise support a means for receiving an acknowledgment that the one or more updated neural-network based precoding coefficients are received at the UE. In some examples, the one or more updated neural-network based precoding coefficients are associated with one or more layers of a multi-layered neural network precoding function.

In some examples, the NN capability manager 1140 may be configured as or otherwise support a means for receiving, from the UE, one or more indications of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof, and where the set of neural-network based precoding coefficients are further determined based on the one or more indications. In some examples, the NN capability manager 1140 may be configured as or otherwise support a means for receiving, from the UE, an indication of one or more supported neural-network based precoding functions from a set of available neural-network based precoding functions. In some examples, the NN capability manager 1140 may be configured as or otherwise support a means for selecting the neural-network based precoding function for uplink channel precoding at the UE based on the one or more supported neural-network based precoding functions.

In some examples, the NN based precoding manager 1135 may be configured as or otherwise support a means for transmitting an indication of the selected neural-network based precoding function of the one or more supported neural-network based precoding functions that is to be used for uplink communications from the UE. In some examples, the NN capability manager 1140 may be configured as or otherwise support a means for receiving, from the UE, one or more indications of a maximum transmit power available at the UE, an allowed transmission power per antenna for one or more antennas at the UE, one or more power amplifier non-linearity parameters, or any combinations thereof, and where the set of neural-network based precoding coefficients are further determined based on the one or more indications.

Figure 12:
FIG. 12 illustrates a diagram of a system including a device that supports channel precoder selection for uplink wireless communications in accordance with one or more aspects of the present disclosure.

FIG. 12 illustrates a diagram of a system 1200 including a device 1205 that supports channel precoder selection for uplink wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting channel precoder selection for uplink wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for receiving one or more uplink reference signals from a UE. The communications manager 1220 may be configured as or otherwise support a means for obtaining a channel estimation associated with a wireless channel used to transmit the one or more uplink reference signals. The communications manager 1220 may be configured as or otherwise support a means for determining, based on the channel estimation, a set of neural-network based precoding coefficients for a neural-network based precoding function for generation of an uplink channel precoding matrix for at least a first uplink communication to be transmitted from the UE. The communications manager 1220 may be configured as or otherwise support a means for transmitting, to the UE, the set of neural-network based precoding coefficients.

By including or configuring the communications manager 1220 in accordance with examples as described herein, the device 1205 may support techniques for NN based precoder selection to provide enhanced support for high mobility scenarios deployments through rapid updates to a precoder for each new channel realization, provide for reduced signaling overhead, provide for reduced processing resources for UEs, and thereby enhance network efficiency and reliability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of channel precoder selection for uplink wireless communications as described herein, or the processor 1235 and the memory 1225 may be otherwise configured to perform or support such operations.

FIG. 13 illustrates a flowchart showing a method 1300 that supports channel precoder selection for uplink wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a set of neural-network based precoding coefficients for a neural-network based precoding function for generation of an uplink channel precoding matrix for at least a first uplink communication to be transmitted from the UE. The operations of 1305 may be performed in accordance with examples as disclosed herein. In some examples, aspects of the operations of 1305 may be performed by an NN based precoding manager 725 as described with reference to FIG. 7.

At 1310, the method may include obtaining a channel estimation associated with a wireless channel that carries the first uplink communication. The operations of 1310 may be performed in accordance with examples as disclosed herein. In some examples, aspects of the operations of 1310 may be performed by a channel estimation manager 730 as described with reference to FIG. 7.

At 1315, the method may include transmitting the first uplink communication via the wireless channel using the uplink channel precoding matrix that is based on the neural-network based precoding function, the set of neural-network based precoding coefficients, and the channel estimation. The operations of 1315 may be performed in accordance with examples as disclosed herein. In some examples, aspects of the operations of 1315 may be performed by an uplink transmission manager 735 as described with reference to FIG. 7.

Figure 14:
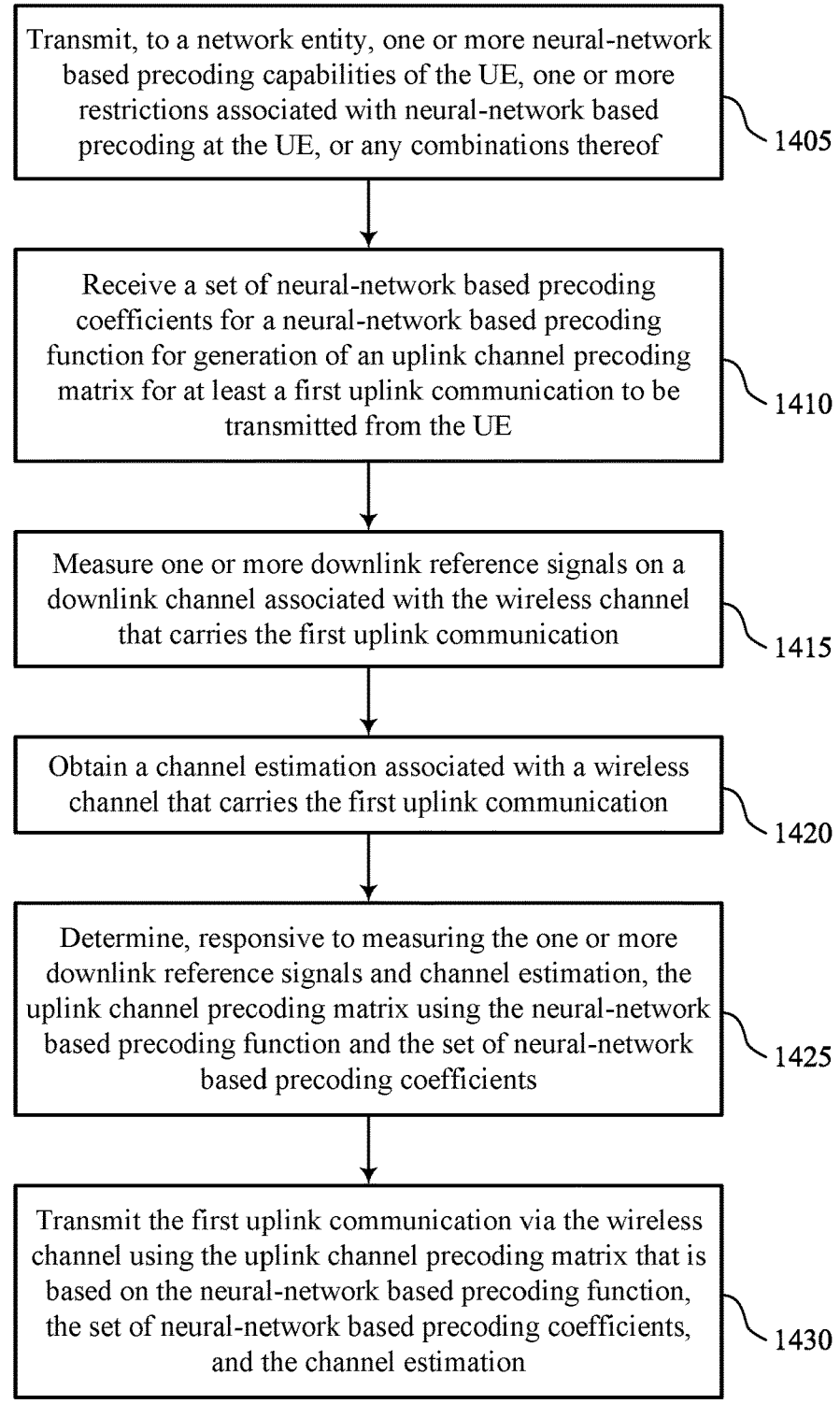

FIG. 14 illustrates a flowchart showing a method 1400 that supports channel precoder selection for uplink wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, one or more neural-network based precoding capabilities of the UE, one or more restrictions associated with neural-network based precoding at the UE, or any combinations thereof. The operations of 1405 may be performed in accordance with examples as disclosed herein. In some examples, aspects of the operations of 1405 may be performed by an NN capability manager 740 as described with reference to FIG. 7.

At 1410, the method may include receiving a set of neural-network based precoding coefficients for a neural-network based precoding function for generation of an uplink channel precoding matrix for at least a first uplink communication to be transmitted from the UE. The operations of 1410 may be performed in accordance with examples as disclosed herein. In some examples, aspects of the operations of 1410 may be performed by an NN based precoding manager 725 as described with reference to FIG. 7.

At 1415, the method may include measuring one or more downlink reference signals on a downlink channel associated with the wireless channel that carries the first uplink communication. The operations of 1415 may be performed in accordance with examples as disclosed herein. In some examples, aspects of the operations of 1415 may be performed by a channel estimation manager 730 as described with reference to FIG. 7.

At 1420, the method may include obtaining a channel estimation associated with a wireless channel that carries the first uplink communication. The operations of 1420 may be performed in accordance with examples as disclosed herein. In some examples, aspects of the operations of 1420 may be performed by a channel estimation manager 730 as described with reference to FIG. 7.

At 1425, the method may include determining, responsive to measuring the one or more downlink reference signals and the channel estimation, the uplink channel precoding matrix using the neural-network based precoding function and the set of neural-network based precoding coefficients. The operations of 1425 may be performed in accordance with examples as disclosed herein. In some examples, aspects of the operations of 1425 may be performed by an NN based precoding manager 725 as described with reference to FIG. 7.

At 1430, the method may include transmitting the first uplink communication via the wireless channel using the uplink channel precoding matrix that is based on the neural-network based precoding function, the set of neural-network based precoding coefficients, and the channel estimation. The operations of 1430 may be performed in accordance with examples as disclosed herein. In some examples, aspects of the operations of 1430 may be performed by an uplink transmission manager 735 as described with reference to FIG. 7.

FIG. 15 illustrates a flowchart showing a method 1500 that supports channel precoder selection for uplink wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting one or more uplink reference signals via the wireless channel for channel estimation and determination of the set of neural-network based precoding coefficients at a network entity. The operations of 1505 may be performed in accordance with examples as disclosed herein. In some examples, aspects of the operations of 1505 may be performed by an uplink reference signal manager 745 as described with reference to FIG. 7.

At 1510, the method may include receiving a set of neural-network based precoding coefficients for a neural-network based precoding function for generation of an uplink channel precoding matrix for at least a first uplink communication to be transmitted from the UE. The operations of 1510 may be performed in accordance with examples as disclosed herein. In some examples, aspects of the operations of 1510 may be performed by an NN based precoding manager 725 as described with reference to FIG. 7.

At 1515, the method may include obtaining a channel estimation associated with a wireless channel that carries the first uplink communication. The operations of 1515 may be performed in accordance with examples as disclosed herein. In some examples, aspects of the operations of 1515 may be performed by a channel estimation manager 730 as described with reference to FIG. 7.

At 1520, the method may include transmitting the first uplink communication via the wireless channel using the uplink channel precoding matrix that is based on the neural-network based precoding function, the set of neural-network based precoding coefficients, and the channel estimation. The operations of 1520 may be performed in accordance with examples as disclosed herein. In some examples, aspects of the operations of 1520 may be performed by an uplink transmission manager 735 as described with reference to FIG. 7.

FIG. 16 illustrates a flowchart showing a method 1600 that supports channel precoder selection for uplink wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving a set of neural-network based precoding coefficients for a neural-network based precoding function for generation of an uplink channel precoding matrix for at least a first uplink communication to be transmitted from the UE. The operations of 1605 may be performed in accordance with examples as disclosed herein. In some examples, aspects of the operations of 1605 may be performed by an NN based precoding manager 725 as described with reference to FIG. 7.

At 1610, the method may include obtaining a channel estimation associated with a wireless channel that carries the first uplink communication. The operations of 1610 may be performed in accordance with examples as disclosed herein. In some examples, aspects of the operations of 1610 may be performed by a channel estimation manager 730 as described with reference to FIG. 7.

At 1615, the method may include transmitting the first uplink communication via the wireless channel using the uplink channel precoding matrix that is based on the neural-network based precoding function, the set of neural-network based precoding coefficients, and the channel estimation. The operations of 1615 may be performed in accordance with examples as disclosed herein. In some examples, aspects of the operations of 1615 may be performed by an uplink transmission manager 735 as described with reference to FIG. 7.

At 1620, the method may include receiving, subsequent to transmission of the first uplink communication one or more updated neural-network based precoding coefficients for one or more subsequent uplink communications. The operations of 1620 may be performed in accordance with examples as disclosed herein. In some examples, aspects of the operations of 1620 may be performed by an NN based precoding manager 725 as described with reference to FIG. 7.

At 1625, the method may include applying the one or more updated neural-network based precoding coefficients to the neural-network based precoding function. The operations of 1625 may be performed in accordance with examples as disclosed herein. In some examples, aspects of the operations of 1625 may be performed by an NN based precoding manager 725 as described with reference to FIG. 7.

Optionally, at 1630, the method may include transmitting an acknowledgment that the one or more updated neural-network based precoding coefficients are received. The operations of 1630 may be performed in accordance with examples as disclosed herein. In some examples, aspects of the operations of 1630 may be performed by an NN based precoding manager 725 as described with reference to FIG. 7.

FIG. 17 illustrates a flowchart showing a method 1700 that supports channel precoder selection for uplink wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1705, the method may include transmitting, to a network entity, capability and restriction information related to neural-network based precoding. The operations of 1705 may be performed in accordance with examples as disclosed herein. In some examples, aspects of the operations of 1705 may be performed by an NN capability manager 740 as described with reference to FIG. 7. In some cases, the capability and restriction information may include one or more of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof. Additionally, or alternatively, the capability and restriction information may include an indication of one or more supported neural-network based precoding functions from a set of available neural-network based precoding functions. Additionally, or alternatively, the capability and restriction information may include one or more of a maximum transmit power available at the UE, an allowed transmission power per antenna for one or more antennas at the UE, one or more power amplifier non-linearity parameters, or any combinations thereof.

At 1710, the method may include receiving a set of neural-network based precoding coefficients for a neural-network based precoding function for generation of an uplink channel precoding matrix for at least a first uplink communication to be transmitted from the UE. The operations of 1710 may be performed in accordance with examples as disclosed herein. In some examples, aspects of the operations of 1710 may be performed by an NN based precoding manager 725 as described with reference to FIG. 7.

At 1715, the method may include receiving an indication of a selected neural-network based precoding function of the one or more supported neural-network based precoding functions that is to be used for uplink communications from the UE. The operations of 1715 may be performed in accordance with examples as disclosed herein. In some examples, aspects of the operations of 1715 may be performed by an NN based precoding manager 725 as described with reference to FIG. 7.

At 1720, the method may include obtaining a channel estimation associated with a wireless channel that carries the first uplink communication. The operations of 1720 may be performed in accordance with examples as disclosed herein. In some examples, aspects of the operations of 1720 may be performed by a channel estimation manager 730 as described with reference to FIG. 7.

At 1725, the method may include transmitting the first uplink communication via the wireless channel using the uplink channel precoding matrix that is based on the neural-network based precoding function, the set of neural-network based precoding coefficients, and the channel estimation. The operations of 1725 may be performed in accordance with examples as disclosed herein. In some examples, aspects of the operations of 1725 may be performed by an uplink transmission manager 735 as described with reference to FIG. 7.

FIG. 18 illustrates a flowchart showing a method 1800 that supports channel precoder selection for uplink wireless communications in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include receiving one or more uplink reference signals from a UE. The operations of 1805 may be performed in accordance with examples as disclosed herein. In some examples, aspects of the operations of 1805 may be performed by an uplink reference signal manager 1125 as described with reference to FIG. 11.

At 1810, the method may include obtaining a channel estimation associated with a wireless channel used to transmit the one or more uplink reference signals. The operations of 1810 may be performed in accordance with examples as disclosed herein. In some examples, aspects of the operations of 1810 may be performed by a channel estimation manager 1130 as described with reference to FIG. 11.

At 1815, the method may include determining, based on the channel estimation, a set of neural-network based precoding coefficients for a neural-network based precoding function for generation of an uplink channel precoding matrix for at least a first uplink communication to be transmitted from the UE. The operations of 1815 may be performed in accordance with examples as disclosed herein. In some examples, aspects of the operations of 1815 may be performed by an NN based precoding manager 1135 as described with reference to FIG. 11.

At 1820, the method may include transmitting, to the UE, the set of neural-network based precoding coefficients. The operations of 1820 may be performed in accordance with examples as disclosed herein. In some examples, aspects of the operations of 1820 may be performed by an NN based precoding manager 1135 as described with reference to FIG. 11.

FIG. 19 illustrates a flowchart showing a method 1900 that supports channel precoder selection for uplink wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from the UE, one or more indications that provide one or more neural-network based precoding capabilities of the UE, one or more restrictions associated with neural-network based precoding at the UE, or any combinations thereof. The operations of 1905 may be performed in accordance with examples as disclosed herein. In some examples, aspects of the operations of 1905 may be performed by an NN capability manager 1140 as described with reference to FIG. 11.

At 1910, the method may include receiving one or more uplink reference signals from a UE. The operations of 1910 may be performed in accordance with examples as disclosed herein. In some examples, aspects of the operations of 1910 may be performed by an uplink reference signal manager 1125 as described with reference to FIG. 11.

At 1915, the method may include obtaining a channel estimation associated with a wireless channel used to transmit the one or more uplink reference signals. The operations of 1915 may be performed in accordance with examples as disclosed herein. In some examples, aspects of the operations of 1915 may be performed by a channel estimation manager 1130 as described with reference to FIG. 11.

At 1920, the method may include determining, based on the channel estimation, a set of neural-network based precoding coefficients for a neural-network based precoding function for generation of an uplink channel precoding matrix for at least a first uplink communication to be transmitted from the UE. The operations of 1920 may be performed in accordance with examples as disclosed herein. In some examples, aspects of the operations of 1920 may be performed by an NN based precoding manager 1135 as described with reference to FIG. 11.

At 1925, the method may include transmitting, to the UE, the set of neural-network based precoding coefficients. The operations of 1925 may be performed in accordance with examples as disclosed herein. In some examples, aspects of the operations of 1925 may be performed by an NN based precoding manager 1135 as described with reference to FIG. 11.

At 1930, the method may include transmitting one or more downlink reference signals to the UE on a downlink channel associated with the wireless channel that carries the first uplink communication, where the one or more downlink reference signals provide for channel estimation at the UE and determination at the UE of the uplink channel precoding matrix using the neural-network based precoding function and the set of neural-network based precoding coefficients. The operations of 1930 may be performed in accordance with examples as disclosed herein. In some examples, aspects of the operations of 1930 may be performed by a downlink reference signal manager 1145 as described with reference to FIG. 11.

Figure 20:
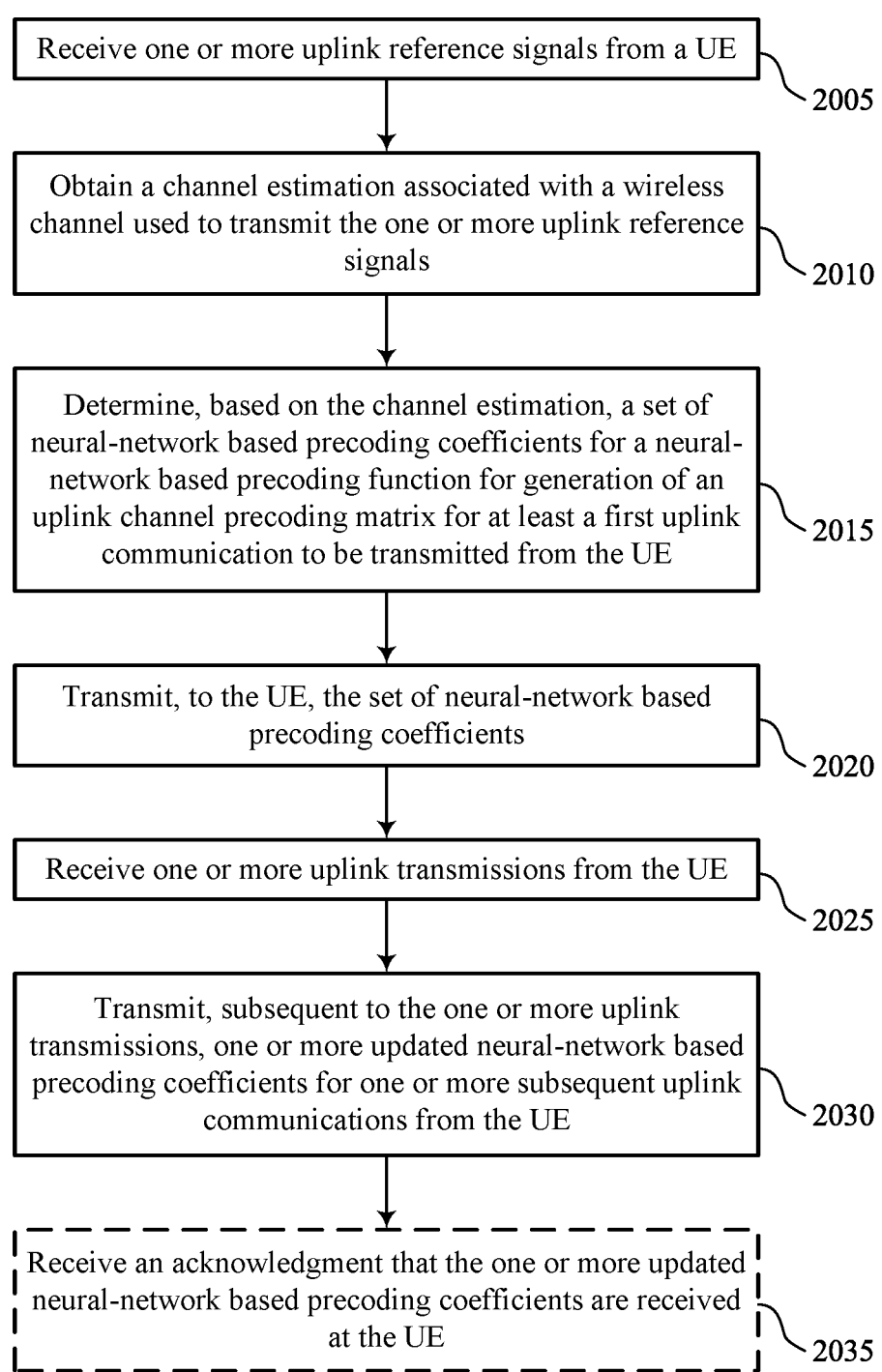

FIG. 20 illustrates a flowchart showing a method 2000 that supports channel precoder selection for uplink wireless communications in accordance with one or more aspects of the present disclosure. The operations of the method 2000 may be implemented by a network entity or its components as described herein. For example, the operations of the method 2000 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 2005, the method may include receiving one or more uplink reference signals from a UE. The operations of 2005 may be performed in accordance with examples as disclosed herein. In some examples, aspects of the operations of 2005 may be performed by an uplink reference signal manager 1125 as described with reference to FIG. 11.

At 2010, the method may include obtaining a channel estimation associated with a wireless channel used to transmit the one or more uplink reference signals. The operations of 2010 may be performed in accordance with examples as disclosed herein. In some examples, aspects of the operations of 2010 may be performed by a channel estimation manager 1130 as described with reference to FIG. 11.

At 2015, the method may include determining, based on the channel estimation, a set of neural-network based precoding coefficients for a neural-network based precoding function for generation of an uplink channel precoding matrix for at least a first uplink communication to be transmitted from the UE. The operations of 2015 may be performed in accordance with examples as disclosed herein. In some examples, aspects of the operations of 2015 may be performed by an NN based precoding manager 1135 as described with reference to FIG. 11.

At 2020, the method may include transmitting, to the UE, the set of neural-network based precoding coefficients. The operations of 2020 may be performed in accordance with examples as disclosed herein. In some examples, aspects of the operations of 2020 may be performed by an NN based precoding manager 1135 as described with reference to FIG. 11.

At 2025, the method may include receiving one or more uplink transmissions from the UE. The operations of 2025 may be performed in accordance with examples as disclosed herein. In some examples, aspects of the operations of 2025 may be performed by an uplink transmission manager 1150 as described with reference to FIG. 11.

At 2030, the method may include transmitting, subsequent to the one or more uplink transmissions, one or more updated neural-network based precoding coefficients for one or more subsequent uplink communications from the UE. The operations of 2030 may be performed in accordance with examples as disclosed herein. In some examples, aspects of the operations of 2030 may be performed by an NN based precoding manager 1135 as described with reference to FIG. 11.

Optionally, at 2035, the method may include receiving an acknowledgment that the one or more updated neural-network based precoding coefficients are received at the UE. The operations of 2035 may be performed in accordance with examples as disclosed herein. In some examples, aspects of the operations of 2035 may be performed by an NN based precoding manager 1135 as described with reference to FIG. 11.

The following provides an overview of aspects of the present disclosure:

Aspect 1: A method for wireless communications at a UE, comprising: receiving a set of neural-network based precoding coefficients for a neural-network based precoding function for generation of an uplink channel precoding matrix for at least a first uplink communication to be transmitted from the UE; obtaining a channel estimation associated with a wireless channel that carries the first uplink communication; and transmitting the first uplink communication via the wireless channel using the uplink channel precoding matrix that is based at least in part on the neural-network based precoding function, the set of neural-network based precoding coefficients, and the channel estimation.

Aspect 2: The method of aspect 1, further comprising: transmitting, to a network entity, one or more neural-network based precoding capabilities of the UE, one or more restrictions associated with neural-network based precoding at the UE, or any combinations thereof.

Aspect 3: The method of any of aspects 1 through 2, further comprising: measuring one or more downlink reference signals on a downlink channel associated with the wireless channel that carries the first uplink communication; and determining, responsive to measuring the one or more downlink reference signals, the uplink channel precoding matrix using the neural-network based precoding function and the set of neural-network based precoding coefficients.

Aspect 4: The method of any of aspects 1 through 3, further comprising: transmitting one or more uplink reference signals via the wireless channel for channel estimation and determination of the set of neural-network based precoding coefficients at a network entity.

Aspect 5: The method of any of aspects 1 through 4, further comprising: receiving, subsequent to transmission of the first uplink communication one or more updated neural-network based precoding coefficients for one or more subsequent uplink communications.

Aspect 6: The method of aspect 5, further comprising: applying the one or more updated neural-network based precoding coefficients to the neural-network based precoding function; and transmitting an acknowledgment that the one or more updated neural-network based precoding coefficients are received.

Aspect 7: The method of any of aspects 5 through 6, wherein the one or more updated neural-network based precoding coefficients are associated with one or more layers of a multi-layered neural network precoding function.

Aspect 8: The method of any of aspects 1 through 7, further comprising: transmitting, to a network entity, one or more of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof.

Aspect 9: The method of any of aspects 1 through 8, further comprising: transmitting, to a network entity, an indication of one or more supported neural-network based precoding functions from a set of available neural-network based precoding functions.

Aspect 10: The method of aspect 9, wherein the receiving the set of neural-network based precoding coefficients further comprises: receiving an indication of a selected neural-network based precoding function of the one or more supported neural-network based precoding functions that is to be used for uplink communications from the UE.

Aspect 11: The method of any of aspects 1 through 10, further comprising: transmitting, to a network entity, one or more of a maximum transmit power available at the UE, an allowed transmission power per antenna for one or more antennas at the UE, one or more power amplifier non-linearity parameters, or any combinations thereof.

Aspect 12: A method for wireless communications at a network entity, comprising: receiving one or more uplink reference signals from a UE; obtaining a channel estimation associated with a wireless channel used to transmit the one or more uplink reference signals; determining, based at least in part on the channel estimation, a set of neural-network based precoding coefficients for a neural-network based precoding function for generation of an uplink channel precoding matrix for at least a first uplink communication to be transmitted from the UE; and transmitting, to the UE, the set of neural-network based precoding coefficients.

Aspect 13: The method of aspect 12, further comprising: receiving, from the UE, one or more indications that provide one or more neural-network based precoding capabilities of the UE, one or more restrictions associated with neural-network based precoding at the UE, or any combinations thereof, and wherein the set of neural-network based precoding coefficients are further determined based at least in part on the one or more indications.

Aspect 14: The method of any of aspects 12 through 13, further comprising: transmitting one or more downlink reference signals to the UE on a downlink channel associated with the wireless channel that carries the first uplink communication, wherein the one or more downlink reference signals provide for channel estimation at the UE and determination at the UE of the uplink channel precoding matrix using the neural-network based precoding function and the set of neural-network based precoding coefficients.

Aspect 15: The method of any of aspects 12 through 14, further comprising: receiving one or more uplink transmissions from the UE; and transmitting, subsequent to the one or more uplink transmissions, one or more updated neural-network based precoding coefficients for one or more subsequent uplink communications from the UE.

Aspect 16: The method of aspect 15, further comprising: receiving an acknowledgment that the one or more updated neural-network based precoding coefficients are received at the UE.

Aspect 17: The method of any of aspects 15 through 16, wherein the one or more updated neural-network based precoding coefficients are associated with one or more layers of a multi-layered neural network precoding function.

Aspect 18: The method of any of aspects 12 through 17, further comprising: receiving, from the UE, one or more indications of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof, and wherein the set of neural-network based precoding coefficients are further determined based at least in part on the one or more indications.

Aspect 19: The method of any of aspects 12 through 18, further comprising: receiving, from the UE, an indication of one or more supported neural-network based precoding functions from a set of available neural-network based precoding functions, and selecting the neural-network based precoding function for uplink channel precoding at the UE based at least in part on the one or more supported neural-network based precoding functions.

Aspect 20: The method of aspect 19, further comprising: transmitting an indication of the selected neural-network based precoding function of the one or more supported neural-network based precoding functions that is to be used for uplink communications from the UE.

Aspect 21: The method of any of aspects 12 through 20, further comprising: receiving, from the UE, one or more indications of a maximum transmit power available at the UE, an allowed transmission power per antenna for one or more antennas at the UE, one or more power amplifier non-linearity parameters, or any combinations thereof, and wherein the set of neural-network based precoding coefficients are further determined based at least in part on the one or more indications.

Aspect 22: An apparatus for wireless communications at a UE, comprising a processor; memory coupled with the processor; and instructions stored in the memory and executable by the processor to cause the apparatus to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a network entity, comprising a processor; memory coupled with the processor; and instructions stored in the memory and executable by the processor to cause the apparatus to perform a method of any of aspects 12 through 21.

Aspect 26: An apparatus for wireless communications at a network entity, comprising at least one means for performing a method of any of aspects 12 through 21.

Aspect 27: A non-transitory computer-readable medium storing code for wireless communications at a network entity, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
   receive, from a network entity, a set of neural-network based precoding coefficients for a neural-network based precoding function for generation of an uplink channel precoding matrix for at least a first uplink communication to be transmitted from the UE;
   obtain a channel estimation associated with a wireless channel that carries the first uplink communication;
   generate the uplink channel precoding matrix based at least in part on application of the set of neural-network based precoding coefficients to the neural-network based precoding function and the channel estimation; and
   transmit the first uplink communication via the wireless channel using the uplink channel precoding matrix that is based at least in part on application of the set of neural-network based precoding coefficients to the neural-network based precoding function and the channel estimation.

2. The apparatus of claim 1, wherein the instructions are further executable by the one or more processors to cause the apparatus to:
   transmit, to the network entity, one or more neural-network based precoding capabilities of the UE, one or more restrictions associated with neural-network based precoding at the UE, or any combinations thereof.

3. The apparatus of claim 1, wherein the instructions are further executable by the one or more processors to cause the apparatus to:
   measure one or more downlink reference signals on a downlink channel associated with the wireless channel that carries the first uplink communication; and
   determine, responsive to measuring the one or more downlink reference signals, the uplink channel precoding matrix using the neural-network based precoding function and the set of neural-network based precoding coefficients.

4. The apparatus of claim 1, wherein the instructions are further executable by the one or more processors to cause the apparatus to:
   transmit one or more uplink reference signals via the wireless channel for channel estimation and determination of the set of neural-network based precoding coefficients at the network entity.

5. The apparatus of claim 1, wherein the instructions are further executable by the one or more processors to cause the apparatus to:

receive, subsequent to transmission of the first uplink communication, one or more updated neural-network based precoding coefficients for one or more subsequent uplink communications.

6. The apparatus of claim 5, wherein the instructions are further executable by the one or more processors to cause the apparatus to:

apply the one or more updated neural-network based precoding coefficients to the neural-network based precoding function; and transmit an acknowledgment that the one or more updated neural-network based precoding coefficients are received.

7. The apparatus of claim 5, wherein the one or more updated neural-network based precoding coefficients are associated with one or more layers of a multi-layered neural-network precoding function.

8. The apparatus of claim 1, wherein the instructions are further executable by the one or more processors to cause the apparatus to:

transmit, to the network entity, one or more of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof.

9. The apparatus of claim 1, wherein the instructions are further executable by the one or more processors to cause the apparatus to:

transmit, to the network entity, an indication of one or more supported neural-network based precoding functions from a set of available neural-network based precoding functions.

10. The apparatus of claim 9, wherein the instructions to receive the set of neural-network based precoding coefficients are further executable by the one or more processors to cause the apparatus to:

receive an indication of a selected neural-network based precoding function of the one or more supported neural-network based precoding functions that is to be used for uplink communications from the UE.

11. The apparatus of claim 1, wherein the instructions are further executable by the one or more processors to cause the apparatus to:

transmit, to the network entity, one or more of a maximum transmit power available at the UE, an allowed transmission power per antenna for one or more antennas at the UE, one or more power amplifier non-linearity parameters, or any combinations thereof.

12. A method for wireless communications at a user equipment (UE), comprising:

receiving, from a network entity, a set of neural-network based precoding coefficients for a neural-network based precoding function for generation of an uplink channel precoding matrix for at least a first uplink communication to be transmitted from the UE;

obtaining a channel estimation associated with a wireless channel that carries the first uplink communication;

generating the uplink channel precoding matrix based at least in part on application of the set of neural-network based precoding coefficients to the neural-network based precoding function and the channel estimation; and transmitting the first uplink communication via the wireless channel using the uplink channel precoding matrix that is based at least in part on application of the set of neural-network based precoding coefficients to the neural-network based precoding function and the channel estimation.

13. The method of claim 12, further comprising:

transmitting, to the network entity, one or more neural-network based precoding capabilities of the UE, one or more restrictions associated with neural-network based precoding at the UE, or any combinations thereof.

14. The method of claim 12, further comprising:

measuring one or more downlink reference signals on a downlink channel associated with the wireless channel that carries the first uplink communication; and determining, responsive to measuring the one or more downlink reference signals, the uplink channel precoding matrix using the neural-network based precoding function and the set of neural-network based precoding coefficients.

15. The method of claim 12, further comprising:

receiving, subsequent to transmission of the first uplink communication, one or more updated neural-network based precoding coefficients for one or more subsequent uplink communications.

16. The method of claim 15, wherein the one or more updated neural-network based precoding coefficients are associated with one or more layers of a multi-layered neural network precoding function.

17. A non-transitory computer-readable medium storing code for wireless communications, the code comprising instructions executable by one or more processors to:

receive, from a network entity, a set of neural-network based precoding coefficients for a neural-network based precoding function for generation of an uplink channel precoding matrix for at least a first uplink communication to be transmitted from a UE;

obtain a channel estimation associated with a wireless channel that carries the first uplink communication;

generate the uplink channel precoding matrix based at least in part on application of the set of neural-network based precoding coefficients to the neural-network based precoding function and the channel estimation; and transmit the first uplink communication via the wireless channel using the uplink channel precoding matrix that is based at least in part on application of the set of neural-network based precoding coefficients to the neural-network based precoding function and the channel estimation.

18. The non-transitory computer-readable medium of claim 17, wherein the instructions are further executable by the one or more processors to:

transmit, to the network entity, one or more neural-network based precoding capabilities of the UE, one or more restrictions associated with neural-network based precoding at the UE, or any combinations thereof.

19. The non-transitory computer-readable medium of claim 17, wherein the instructions are further executable by the one or more processors to:

measure one or more downlink reference signals on a downlink channel associated with the wireless channel that carries the first uplink communication; and determine, responsive to measuring the one or more downlink reference signals, the uplink channel precoding matrix using the neural-network based precoding function and the set of neural-network based precoding coefficients.

20. The non-transitory computer-readable medium of claim 17, wherein the instructions are further executable by the one or more processors to:

transmit one or more uplink reference signals via the wireless channel for channel estimation and determination of the set of neural-network based precoding coefficients at the network entity.

21. The non-transitory computer-readable medium of claim 17, wherein the instructions are further executable by the one or more processors to:

receive, subsequent to transmission of the first uplink communication one or more updated neural-network based precoding coefficients for one or more subsequent uplink communications.

22. The non-transitory computer-readable medium of claim 21, wherein the instructions are further executable by the one or more processors to:

apply the one or more updated neural-network based precoding coefficients to the neural-network based precoding function; and transmit an acknowledgment that the one or more updated neural-network based precoding coefficients are received.

23. The non-transitory computer-readable medium of claim 21, wherein the one or more updated neural-network based precoding coefficients are associated with one or more layers of a multi-layered neural network precoding function.

24. The non-transitory computer-readable medium of claim 17, wherein the instructions are further executable by the one or more processors to:

transmit, to the network entity, one or more of a neural-network dimensionality capability of the UE, a number of neural-network layers supported at the UE for the neural-network based precoding function, a neural-network connectivity associated with one or more neural-network layers, one or more neural-network structures supported at the UE, or any combinations thereof.

25. The non-transitory computer-readable medium of claim 17, wherein the instructions are further executable by the one or more processors to:

transmit, to the network entity, an indication of one or more supported neural-network based precoding functions from a set of available neural-network based precoding functions.

26. The non-transitory computer-readable medium of claim 25, wherein the instructions to receive the set of neural-network based precoding coefficients are further executable by the one or more processors to:

receive an indication of a selected neural-network based precoding function of the one or more supported neural-network based precoding functions that is to be used for uplink communications from the UE.

27. The non-transitory computer-readable medium of claim 17, wherein the instructions are further executable by the one or more processors to:

transmit, to the network entity, one or more of a maximum transmit power available at the UE, an allowed transmission power per antenna for one or more antennas at the UE, one or more power amplifier non-linearity parameters, or any combinations thereof.

28. A user equipment (UE) for wireless communications, comprising:

means for receiving, from a network entity, a set of neural-network based precoding coefficients for a neural-network based precoding function for generation of an uplink channel precoding matrix for at least a first uplink communication to be transmitted from the UE;

means for obtaining a channel estimation associated with a wireless channel that carries the first uplink communication;

means for generating the uplink channel precoding matrix based at least in part on application of the set of neural-network based precoding coefficients to the neural-network based precoding function and the channel estimation; and means for transmitting the first uplink communication via the wireless channel using the uplink channel precoding matrix that is based at least in part on application of the set of neural-network based precoding coefficients to the neural-network based precoding function and the channel estimation.

29. The UE of claim 28, further comprising:

means for transmitting, to the network entity, one or more neural-network based precoding capabilities of the UE, one or more restrictions associated with neural-network based precoding at the UE, or any combinations thereof.

30. The UE of claim 28, further comprising:

means for measuring one or more downlink reference signals on a downlink channel associated with the wireless channel that carries the first uplink communication; and means for determining, responsive to measuring the one or more downlink reference signals, the uplink channel precoding matrix using the neural-network based precoding function and the set of neural-network based precoding coefficients.

* * * * *